United States Patent
Marvit et al.

(10) Patent No.: US 7,096,355 B1
(45) Date of Patent: Aug. 22, 2006

(54) DYNAMIC ENCODING ALGORITHMS AND INLINE MESSAGE DECRYPTION

(75) Inventors: Maclen Marvit, San Francisco, CA (US); Keith David Rosema, Seattle, WA (US); Jeffrey Ubois, Albany, CA (US); David Marvit, San Francisco, CA (US); Dean Brettle, Gaithersburg, MD (US); Yair Zadik, Palo Alto, CA (US); Stuart Goodnick, San Francisco, CA (US)

(73) Assignee: Omniva Corporation, San Francisco, CA (US)

( * ) Notice: Subject to any disclaimer, the term of this patent is extended or adjusted under 35 U.S.C. 154(b) by 910 days.

(21) Appl. No.: 09/923,847

(22) Filed: Aug. 6, 2001

Related U.S. Application Data

(63) Continuation-in-part of application No. 09/300,085, filed on Apr. 26, 1999, now Pat. No. 6,625,734.

(60) Provisional application No. 60/222,815, filed on Aug. 4, 2000.

(51) Int. Cl.
*G06F 17/30* (2006.01)
*H04K 1/00* (2006.01)
*H04L 9/00* (2006.01)
*H04L 9/14* (2006.01)

(52) U.S. Cl. ............... 713/162; 380/264; 380/279; 380/280; 713/162; 713/167; 713/168; 713/176; 726/26; 726/30

(58) Field of Classification Search ............... 713/168, 713/201; 380/258, 277–279
See application file for complete search history.

(56) References Cited

U.S. PATENT DOCUMENTS

| | | | |
|---|---|---|---|
| 5,265,159 A | 11/1993 | Kung | 380/4 |
| 5,410,602 A | 4/1995 | Finkelstein et al. | 380/21 |
| 5,775,995 A | 7/1998 | Okamoto | 463/40 |
| 5,786,817 A | 7/1998 | Sakano et al. | 345/339 |
| 5,794,253 A | 8/1998 | Norin et al. | 707/203 |
| 5,870,548 A | 2/1999 | Nielsen | 395/200.36 |
| 5,958,005 A | 9/1999 | Thorne et al. | 709/202 |
| 6,049,838 A * | 4/2000 | Miller et al. | 719/315 |
| 6,134,660 A | 10/2000 | Boneh et al. | 713/193 |
| 6,215,877 B1 * | 4/2001 | Matsumoto | 380/277 |
| 6,223,287 B1 * | 4/2001 | Douglas et al. | 713/178 |
| 6,226,752 B1 * | 5/2001 | Gupta et al. | 713/201 |
| 6,324,650 B1 | 11/2001 | Ogilvie | |
| 6,334,189 B1 * | 12/2001 | Granger et al. | 726/26 |
| 6,625,734 B1 * | 9/2003 | Marvit et al. | 713/201 |

FOREIGN PATENT DOCUMENTS

| | | |
|---|---|---|
| WO | WO 98/49643 | 4/1998 |
| WO | WO 98/58321 | 6/1998 |
| WO | WO 98/05814 | 7/1998 |
| WO | WO 98/35474 | 8/1998 |

OTHER PUBLICATIONS

Hush Communications Corp, "Hushmail — PGP Compatible Secure Free Email — Help", 1999-2005 Hush Communications Corp, entire document, www.hushmail.com/help-faqs2.*
Szor, P.,"Advanced Code Evolution Techniques and Computer Virus Generator Kits", Pearson Educational, Inc., InformIT, Mar. 25, 2005, entire document, www.awprofessional.com/articles/article.asp?p=366890&seqNum=3.*
Microsoft Corp., "Microsoft CryptoAPI," Jan 17, 1996, Microsoft Corp., Version 0.9, entire document.
ZipLip Inc., web site URL "https://www.ziplip.com/products.html", 1999-2002, entire page.
ZipLipInc., web site URL https://www.ziplip.com/products/ZLPublicKeyInfrastructure.html, 1999-2002, entire page.
ZipLip, Inc., web site URL https://www.ziplip.com/technology/summary.html, 1999-2002, entire page.

\* cited by examiner

*Primary Examiner*—Ayaz Sheikh
*Assistant Examiner*—Ronald Baum
(74) *Attorney, Agent, or Firm*—Hickman Palermo Truong & Becker LLP; Edward A. Becker

(57) ABSTRACT

In general, data exchanged between users is protected using any of various encoding approaches. An example of encoding is encryption, but any kind of encoding may be used. The data used to encrypt the data exchanged between the users, referred to as a "key", is maintained only in a key repository. Users must obtain a key from the key repository to either encode or decode, encrypt or decrypt data, after which the user's copy of the key is destroyed or otherwise rendered inoperable. A key management policy is employed to control access to the keys maintained by the key repository. Encoding algorithms may be dynamically changed over time. Users may negotiate different algorithms to be used with specific users or messages. Thus, different algorithms may be used between different sets of users depending upon what the member users of those sets negotiate among themselves. The frequency at which algorithms are changed may also be separately negotiated between users. The frequency may vary depending, for example, upon the perceived risk of intrusion by unauthorized third parties, the content of the messages being transmitted, or both. According to an inline message decryption approach, an encoded message is provided to a user in a form that enables the user's client to process the encoded message using conventional client tools and obtain the cleartext message. This eliminates the need for a user's client to be aware of the particular encoding algorithm used to encode the message. Various embodiments of the inline message decryption approach include: a) in-situ decryption; b) remote decryption; and c) data uploading. An approach is also provided for exchanging data between nodes in a network using sets of associated URLs.

30 Claims, 21 Drawing Sheets

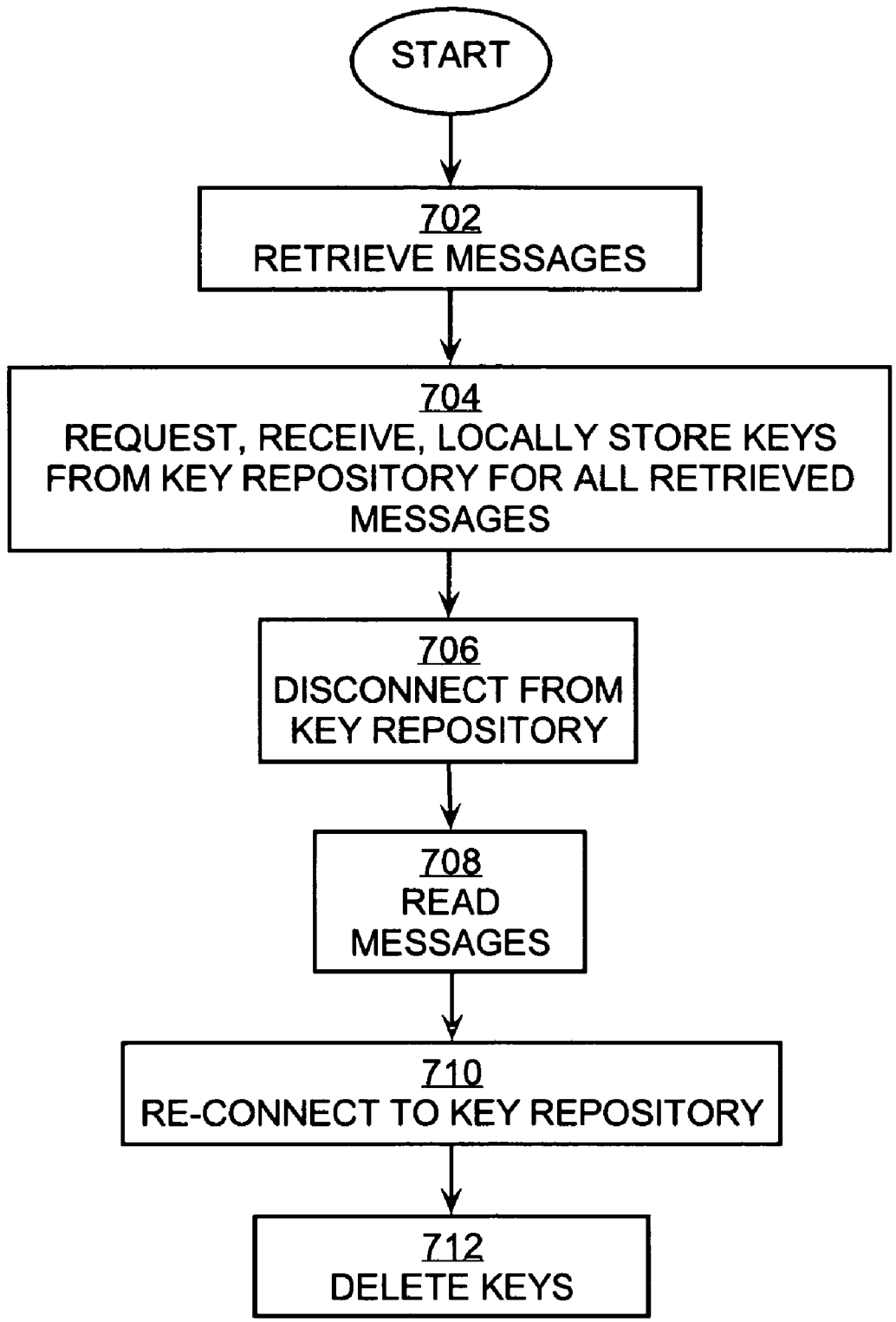

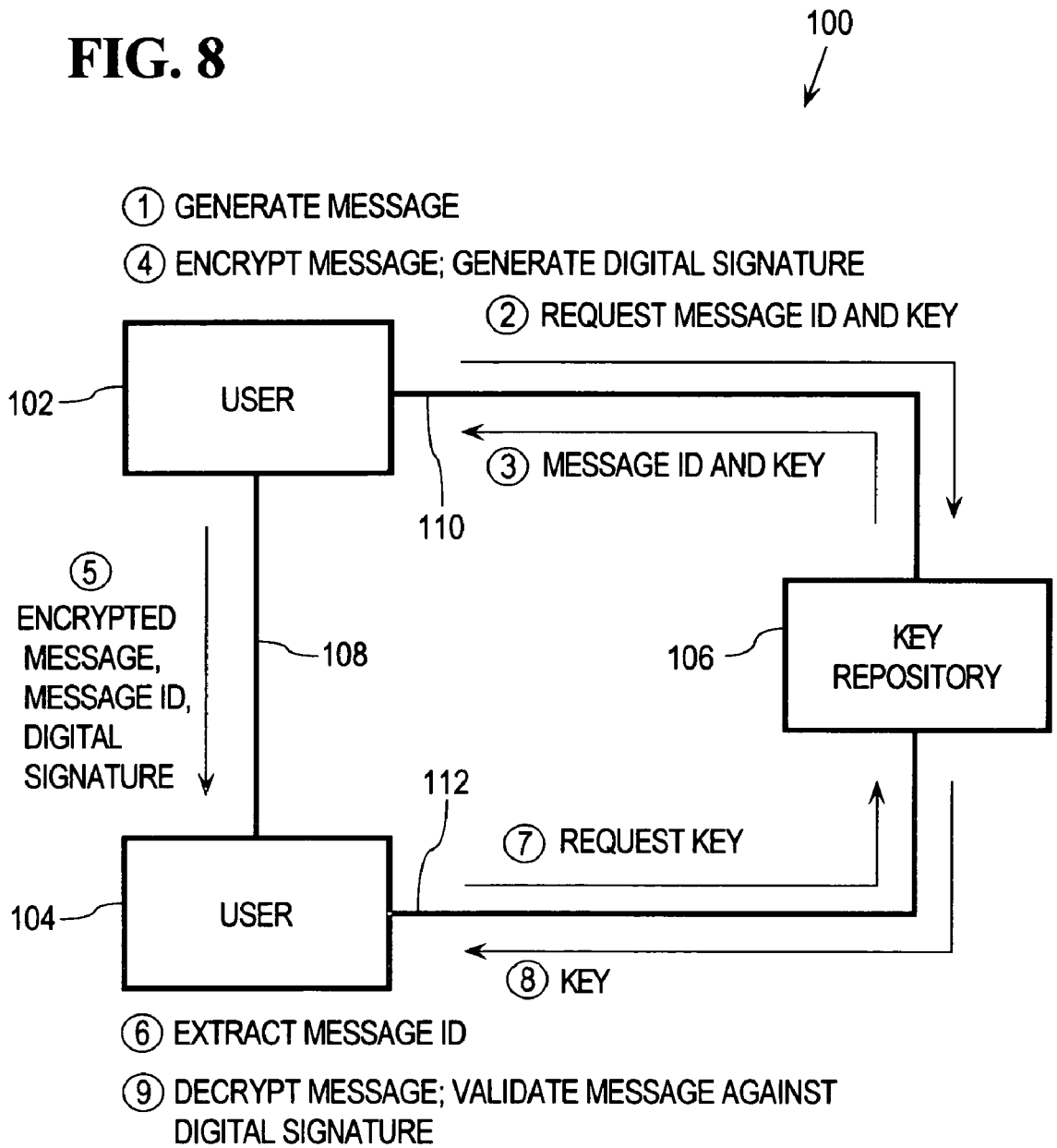

DYNAMIC ENCODING ALGORITHMS AND INLINE MESSAGE DECRYPTION

RELATED APPLICATIONS

This application is a continuation-in-part application of U.S. patent application Ser. No. 09/300,085 filed Apr. 26, 1999, now issued as U.S. Pat. No. 6,625,734, which is hereby incorporated herein by reference in its entirety for all purposes. This application also claims priority under 35 U.S.C. § 120 to U.S. provisional patent application No. 60/222,815 filed Aug. 4, 2000, which is hereby incorporated herein by reference in its entirety for all purposes.

FIELD OF THE INVENTION

The invention relates generally to networked data processing, and relates more specifically to an approach for controlling and tracking access to information that is disseminated by a network.

BACKGROUND OF THE INVENTION

Many computers are now interconnected in one or more networks or internetworks. One of the most widely used communications networks is the worldwide packet data communication network known as the Internet. The Internet provides access to enormous amounts of information and may be used to transport electronic mail ("email"). A user of a network such as the Internet is associated with a unique email address. The email address may represent an account that is maintained on an email server. Anyone with a computer and an email processing program ("email client") can remotely send one or more email messages to any address among millions of addresses, and the recipient may use its email client to read the messages.

Despite the benefits provided by the Internet, users have recently recognized important security issues associated with Internet email. First, the complexity of the Internet allows information to fall into the hands of unintended third parties. For example, when an email is sent via the Internet, the email may travel through numerous sub-networks to reach its destination. Many of these sub-networks include locations where data is temporarily stored before being forwarded to the next location. As a result, copies of an email may be stored at numerous locations unknown to the sender, even though the sender only intended for the email to be provided to a particular recipient or group of recipients. Further, email is easily forwarded to other recipients that are not known to the original sender. As a result, although a sender intends for only a particular recipient to receive a particular email, the email may be forwarded to and received by other recipients.

Once the email has been transported via the Internet, deleting all copies of the email can be difficult, if not impossible, to accomplish. Consider a sensitive email that has been sent via the Internet and now needs to be completely deleted. Locating and deleting the email from the sending and receiving locations is relatively straightforward. However, locating and deleting all copies of the email is difficult, if not impossible, because of the difficulty in determining the locations of all copies of the email. Because the Internet is a packet-switched network, data packets that make up a particular message, or a complete copy of a message, may be stored on intermediate servers of internetworks logically located between sender and recipient; the location of such servers is not predictable. Furthermore, even if all copies of the email are located, special privileges or permissions may be required to delete the copies. For example, some copies may reside on servers in remote locations in other countries. As a result, deleting all copies of the email may be extremely difficult, if not impossible, to accomplish.

These problems are not limited to the Internet. Many corporations have extensive communication networks that have numerous servers, archives, hubs and backup systems where email might be stored.

Moreover, these problems are not limited to email, but apply to any type of information transported over communication networks.

Based on the foregoing, there is a need to control and track access to information disseminated on communications networks. There is a particular need for a comprehensive approach for controlling and tracking access to data disseminated on communications networks.

SUMMARY OF THE INVENTION

According to one aspect of the invention, a method is provided for controlling and tracking access to a message that is communicated from a first node to a second node in a network. The method includes receiving a request from the first node for a message identifier that uniquely identifies the message and a key that may be used to encode the message. The method also requires generating, in response to the request, both the message identifier and the key and providing both the message identifier and the key to the first node to allow the message to be encoded with the key to generate an encoded message. The method also requires receiving a request from the second node for the key and generating algorithm identification data that indicates an algorithm to be used to decode the encoded message. The method further requires providing the algorithm identification data to the second node, providing the key and the identification data to the second node to allow the encoded message to be decoded and the message to be retrieved using the key and deleting the key based upon specified key policy criteria to prevent copies of the encoded message from being decoded.

According to another aspect of the invention, a method is provided for controlling and tracking access to a message that is communicated from a first node to a second node in a network. The method includes generating, at the first node, an encoded message by encoding the message with a key and generating, at the first node, a set of one or more instructions that contain the encoded message and instructions for decoding the encoded message using the key. The method also includes providing the set of one or more instructions to the second node, wherein, processing the set of one or more instructions at the second node causes the message to be recovered from the encoded message contained in the set of one or more instructions by retrieving the key, and decoding the encoded message using the key.

According to another aspect of the invention, a method is provided for controlling and tracking access to a message that is communicated from a first node to a second node in a network. The method includes generating, at the first node, an encoded message by encoding the message with a key and generating, at the first node, a set of one or more instructions that contain the encoded message and instructions for transferring to a third node the encoded message and instructions for retrieving the key. The method also includes providing the set of one or more instructions to the second node, wherein, processing the set of one or more instructions at the second node causes the encoded message and the instructions for retrieving the key to be transferred to the third node; and wherein, the receiving, at the third node, of the encoded message and the instructions for retrieving the key causes the message to be recovered from the encoded message by retrieving the key, and decoding the encoded message using the key, and the recovered message to be provided from the third node to the second node.

According to another aspect of the invention, a method is provided for exchanging data between nodes in a network. The method includes embedding, in one or more associated uniform resource locators (URLs), data and control information and providing the set of one or more associated URLs from a source node to a destination node, wherein the data and control information may be extracted from the set of one or more associated URLs at the destination node.

BRIEF DESCRIPTION OF THE DRAWINGS

Embodiments are illustrated by way of example, and not by way of limitation, in the figures of the accompanying drawings in which like reference numerals refer to similar elements and in which:

FIG. 7A is a flow diagram of a process of reading messages offline;

FIG. 8 is a block diagram of a process of applying a digital signature to a message;

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of exemplary embodiments are described in more detail in the following sections: (1) introduction; (2) system overview; (3) rendering disseminated data inaccessible; (4) tracking access to disseminated data; (5) key management; (6) multiple key repository applications; (7) key layering; (8) re-keying; (9) offline applications; (10) message verification; (11) message declassification; (12) message repository applications; (13) dynamic encoding algorithms; (14) inline message decryption; and (15) implementation mechanisms.

1. Introduction

Controlling and tracking access to disseminated information is described. In general, data exchanged between users is protected using any of various encoding approaches. An example of encoding is encryption, but any kind of encoding may be used. The data used to encrypt the data exchanged between the users, referred to as a "key", is maintained only in a key repository. Users must obtain a key from the key repository to either encode or decode, encrypt or decrypt data, after which the user's copy of the key is destroyed or otherwise rendered inoperable. A key management policy is employed to control access to the keys maintained by the key repository.

This approach effectively controls and tracks access to data at any location, known or unknown, to the users. Furthermore, all copies of data at all locations may be made inaccessible without having to know where those copies reside. The approach is applicable to any type of data in any format and the invention is not limited to any type of data or any type of data format. Examples of data include, but are not limited to, text data, voice data, graphics data and email.

2. Structural Overview

Figure 1:
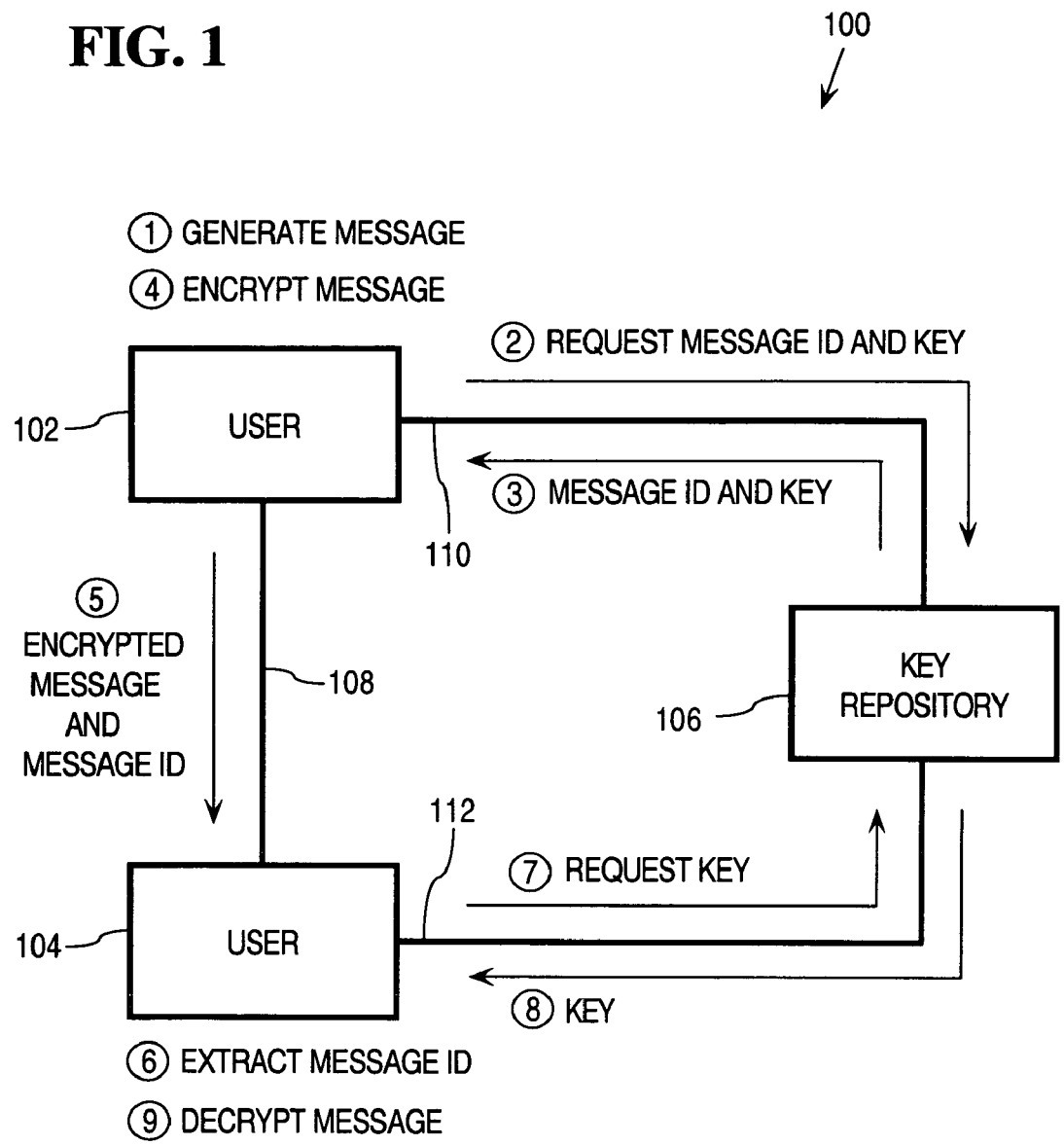
FIG. 1 is a block diagram of a system for controlling and tracking access to disseminated information.

FIG. 1 illustrates a system 100 for controlling and tracking access to disseminated information according to an embodiment. System 100 includes users 102, 104 and a key repository 106. As used in this document, the term "user" is analogous to a location, a node in a network or a client. A node may comprise a physical or logical location or device. For example, a node may be a network end station such as a workstation, personal computer, server, or the equivalent.

Users 102, 104 are logically coupled by and can communicate using a link 108. User 102 and key repository 106 are communicatively coupled via a link 110. User 104 and key repository 106 are communicatively coupled via a link 112. Links 108, 110 and 112 may be implemented using any mechanism to provide for the exchange of data between users 102, 104 and key repository 106. Examples of links 108, 110 and 112 include, but are not limited to, network connections, wires, fiber-optic links and wireless communications links.

Links 108, 110, 112 may include several connections, networks, or internetworks. For example, link 108 may include an Internet connection. Thus, users 102, 104 and key repository 106 may be located on the same node or on different nodes in a distributed arrangement. The invention is not limited to any particular implementation of links 108, 110, 112.

The structure of key repository 106, and the operation of system 100 to control and track access to disseminated information according to one embodiment, is now described with reference to FIG. 1. The following description uses the context of sending a message from user 102 to user 104. As used in this document, the term "message" refers to a body of data formatted in any manner for conveying information. An example of a message is an email message, but a message may comprise a packet, a datagram, or a message conveyed at any level of abstraction within a network, its transport mechanisms, or its applications.

First, user 102 generates the message to be sent to user 104. User 102 then requests a message identifier ("message ID") and a key from key repository 106 over link 110.

In response, key repository 106 generates and stores a unique message ID and a unique key associated with the generated message ID. Ideally, the generated message ID is sufficiently unique and complex to prevent, or at least reduce the likelihood of, a user systematically requesting and collecting keys to be used to decode messages that are later intercepted.

Figure 2:
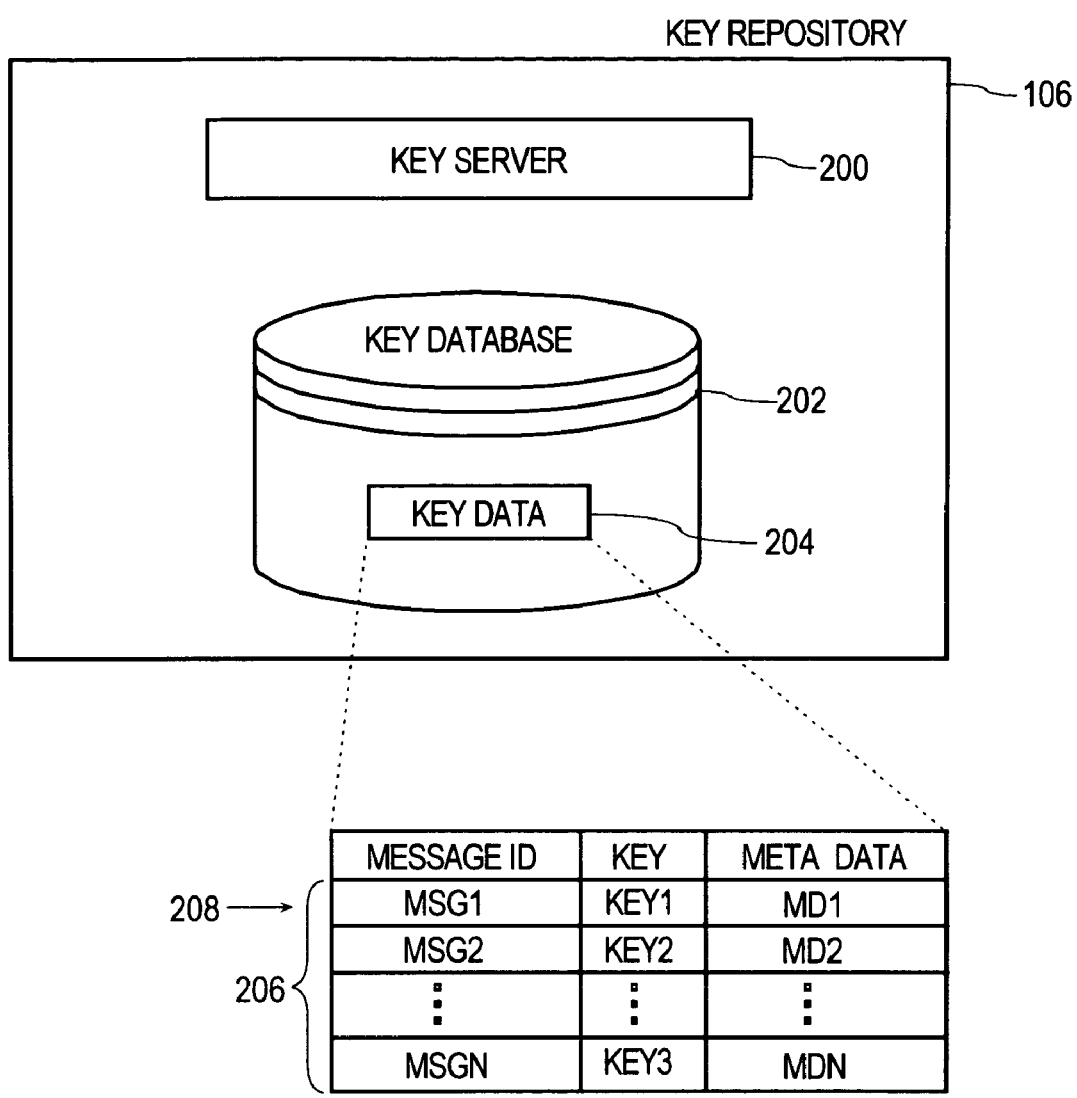
FIG. 2 is a block diagram of a key repository.

FIG. 2 is a block diagram that illustrates an example embodiment of key repository 106. Key repository 106 may be implemented in many ways, and the invention is not limited to a particular key repository implementation.

In the configuration of FIG. 2, key repository 106 includes a key server 200 and a key database 202. Key server 200 causes unique message IDs and keys to be generated in response to user requests. Key server 200 also causes generated message IDs and keys to be stored in key database 202. Key server 200 also causes stored message IDs and keys to be retrieved from key database 202 in response to user requests as described further below. Key database 202 may be implemented as any type of volatile or non-volatile storage but is generally implemented as non-volatile storage, such as one or more disks. Key database 202 may utilize a commercial database server system, such as the Oracle® or Sybase® database servers.

In the present example, message IDs and keys are stored in key data 204. Specifically, key data 204 includes one or more key data entries 206 corresponding to message ID/key pairs. For example, entry 208 corresponds to message MSG1 with key KEY1. Each entry 206 also contains meta data that specifies one or more attributes of the corresponding message that is used to manage access to and deletion of keys in accordance with various key management policy criteria, as described further below. Specifically, entry 208 includes meta data MD1.

In some situations, the security of key repository 106 may be important. Specifically, there may be concerns that an unauthorized user may gain access to key repository 106 and may alter or destroy data, such as message IDs and keys, contained on key database 202. Accordingly, various precautions may be employed to prevent, or at least reduce, the likelihood of an unauthorized user gaining access to and altering or destroying data stored on key database 202.

For example, key repository 106 may be implemented within a secure physical structure that limits unauthorized physical access to key repository 106. Key repository 106 may also be implemented with a secure interface to link 110 and link 112. Key repository may also use a secure communications protocol to reduce the likelihood of an unauthorized user gaining access to key repository 106. For example, a user may be required to provide a unique user ID to key repository 106 when requesting a key to verify that the user is authorized to obtain keys from key repository 106. Also, key repository 106 may be implemented with one or more backup key databases for maintaining data.

There may exist similar concerns about the security of link 110 and link 112. Specifically, there may be concerns that unauthorized users may gain access to message IDs and keys being transmitted over link 110 and link 112. Therefore, according to one embodiment, link 110 and link 112 are secure, to reduce the likelihood that a third party eavesdropper can intercept message IDs and keys transmitted over link 110 and link 112.

After generating and storing the unique message ID and unique key, key repository 106 provides the message ID and associated key to user 102. User 102 encrypts the message to be sent to user 104 using the key to generate an encrypted message. Any type of encryption may be used to generate the encrypted message, and the invention is not limited to any particular type of encryption. An example of a suitable method of encryption is data encryption standard (DES) encryption. User 102 then destroys, or otherwise makes unusable, its local copy of the key.

User 102 then provides both the encrypted message and the message ID to user 104 over link 108. The message ID may be provided to user 104 separate from the encrypted message or may be provided with the encrypted message. According to one embodiment, the message ID is attached, e.g., appended to the beginning or end, of the encrypted message. As previously described, link 108 may include a connection via the Internet or other communications network. Since the message is encrypted, it is impossible, or at least computationally infeasible, for anyone to determine the contents of the encrypted message without the correct key.

At this point in the example process, user 104 possesses both the encrypted message and the message ID from user 102. User 104 cannot retrieve, however, the contents of the encrypted message received from user 102. Therefore, according to an embodiment, user 104 requests a key from key repository 106 to decrypt the message received from user 102. In situations where the message ID has been attached to the encrypted message, user 104 extracts the message ID from the encrypted message.

User 104 provides the message ID to key repository 106 to identify which key user 104 is requesting. Key repository 106 retrieves the key associated with the message ID received from user 104 and provides the key to user 104. User 104 decrypts the encrypted message using the key to retrieve the original, unencrypted message. User 104 then destroys, or otherwise makes unusable, its local copy of the key.

Once user 104 has retrieved the original message, user 104 can distribute the original message in unencrypted, cleartext form to other users. For example, if user 104 is using or executing an embodiment under control of an operating system having a graphical user interface, such as the Windows NT, Mac OS, or Solaris operating systems, user 104 may be able to use the native "cut-and-paste" facilities of the operating system to copy the cleartext. Therefore, to reduce the likelihood that user 104 will distribute the cleartext to other users, various controls may be placed on users that decrypt messages.

According to an embodiment, a mechanism is provided that allows users to view cleartext, but does not provide the cleartext in any form that can be distributed to other users. For example, user 102 and user 104 may be implemented with an application shell that automatically retrieves keys from key repository 106 and displays messages to user 102 and to user 104 in cleartext. The application shell calls functions of the operating displays the cleartext in a window of the operating system in which the editing functions are unavailable or inhibited. Thus, the application shell is one example of a mechanism that prevents the user from receiving the decrypted message in a form that can be copied or further disseminated.

According to another embodiment, key repository 106 is notified when an encrypted message is converted to cleartext so that the locations of cleartext messages can be tracked.

3. Rendering Disseminated Data Inaccessible

The previous description shows that for user 104 to determine the contents of the encrypted message received from user 102, user 104 must request and receive a key for that particular encrypted message from key repository 106. Without the correct key, the encrypted message is useless to user 104.

At some point in time, it may be desirable to render inaccessible all copies of particular disseminated data. For example, the disseminated data may contain valuable company secrets that have been distributed to a group of specified employees, and it may be desirable to render inaccessible all copies of the disseminated data that contain the secrets. The decision to render inaccessible particular disseminated data is typically made according to various policy or management considerations that are discussed further below.

Assuming that it is desirable to render inaccessible the data sent from user 102 to user 104, then according to an embodiment, the key associated with the message is deleted from key repository 106. The associated message ID may also be deleted from key repository 106 since there will be no use for the message ID after the key is deleted. Keys are deleted by key repository 106 based upon either specified key policy criteria evaluated by the key repository or in response to user requests. This aspect of the invention is described further below, in the context of key policy management.

If user 102 and user 104 destroy their copies of the key received from key repository 106, there will be no remaining or existing copies of the keys to decrypt the message. Without the correct key, it is impossible, or at least computationally infeasible, to extract the original message from any copies of the encrypted message originally generated by user 102, regardless of where those copies may reside. For example, assume that link 108 is connected across an open, untrusted network such as the Internet. Further assume that sending the encrypted message from user 102 to user 104 causes several, or even many, copies of the encrypted message to be generated and stored at various locations throughout the Internet. Without the correct key, it is impossible, or at least computationally infeasible, to extract the original message from any copy of the encrypted message. All copies of the encrypted message have been rendered inaccessible, regardless of where they reside, in the sense that each copy is unusable. As a result, copies of the encrypted message do not have to be individually located as required by prior approaches.

In an alternate embodiment, user 102 or user 104 may execute an email client that is configured such that messages for which keys have been deleted are not displayed. For example, a Deleted flag may be stored in association with each message stored by the email client, in which the Deleted flag indicates that keys associated with the message have been deleted from the key repository. Each time the email client initializes, it checks the key repository for a key matching each message that is stored in a folder or box that is maintained by the email client. If the keys have been deleted, then the email client deletes the associated message from the folder, box, or associated display. Alternatively, the email client checks for associated keys when the folder or box is displayed. In another alternative, the email client checks for the keys when the user selects and attempts to open or display the message.

Figure 3A:
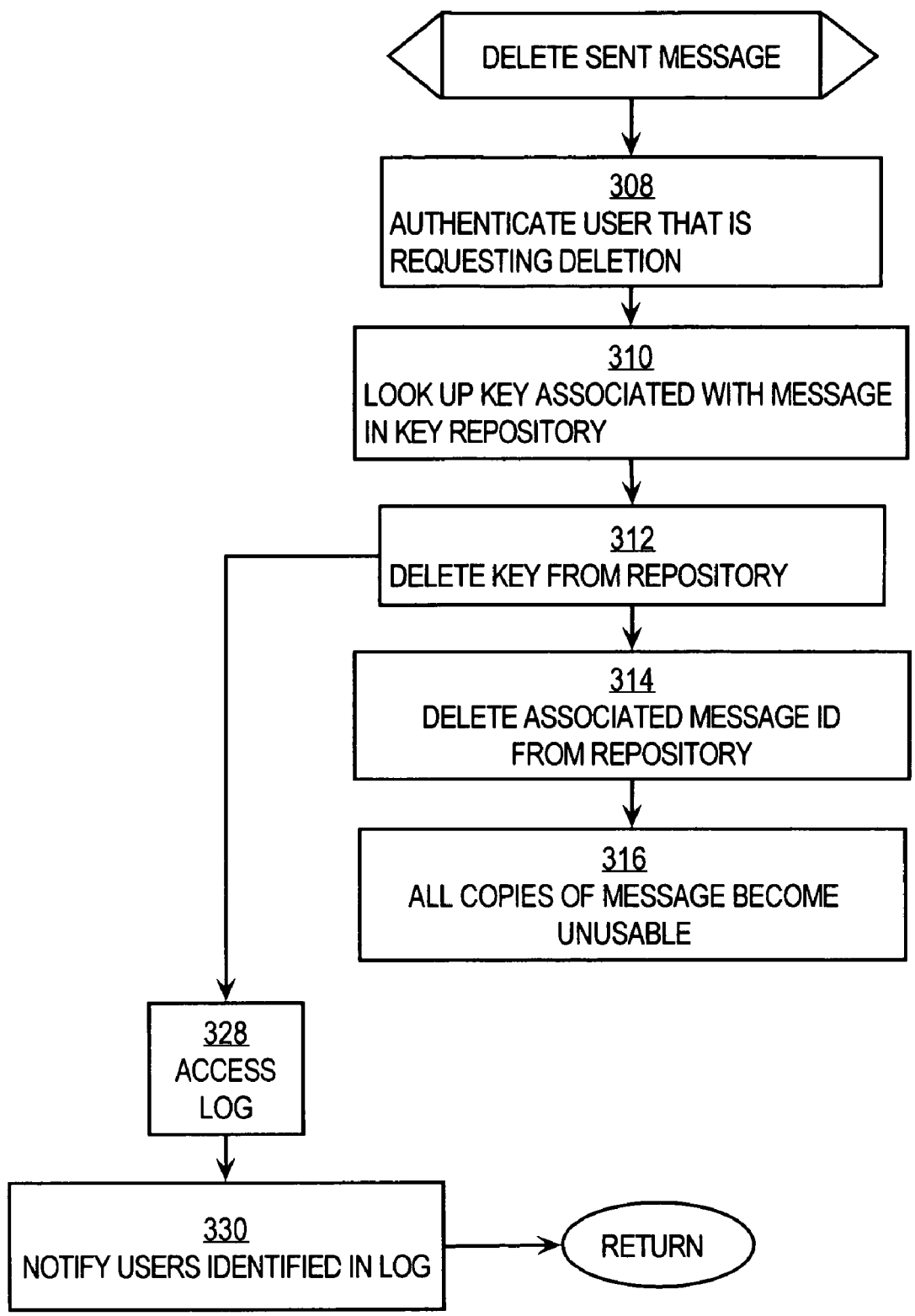
FIG. 3A is a flow diagram of a process of deleting a sent message.

FIG. 3A is a flow diagram of a process of deleting a sent message. Generally, the process is initiated by a user requesting deletion of a sent message. In block 308, the process authenticates the user to determine that the user is authorized to request deletion. Normally, the authentication involves determining that the user is associated with the sent message in some way. For example, the authentication may involve testing whether the requesting user is the author or original sender of the message.

In block 310, the process looks up a key that is associated with the message in the key repository. In block 312, the process deletes the key from the repository. In block 314, the process deletes the message ID associated with the message and the key from the repository. Thus, as shown by block 316, all copies of the message become unreadable.

In one alternative embodiment, the process also accesses a log 300, as shown in block 328. The form, structure, and general functions of log 300 are described further below. Block 328 may involve opening the log, reading from it each entry that is associated with the message to be rendered inaccessible, and determining the identity of each user that has converted the message to cleartext. In block 330, the process notifies each of the users identified from the log that the message has been rendered inaccessible. In response, each user is expected to remove their cleartext versions of the message from local storage.

4. Tracking Access to Disseminated Data

In some situations, it may be desirable to know which users, if any, have read a particular message or email. Thus, it may be desirable to know which users, if any, have requested keys, and which messages the keys are associated with. According to an embodiment of the invention, a log is used to track when keys are issued or granted.

Figure 4A:
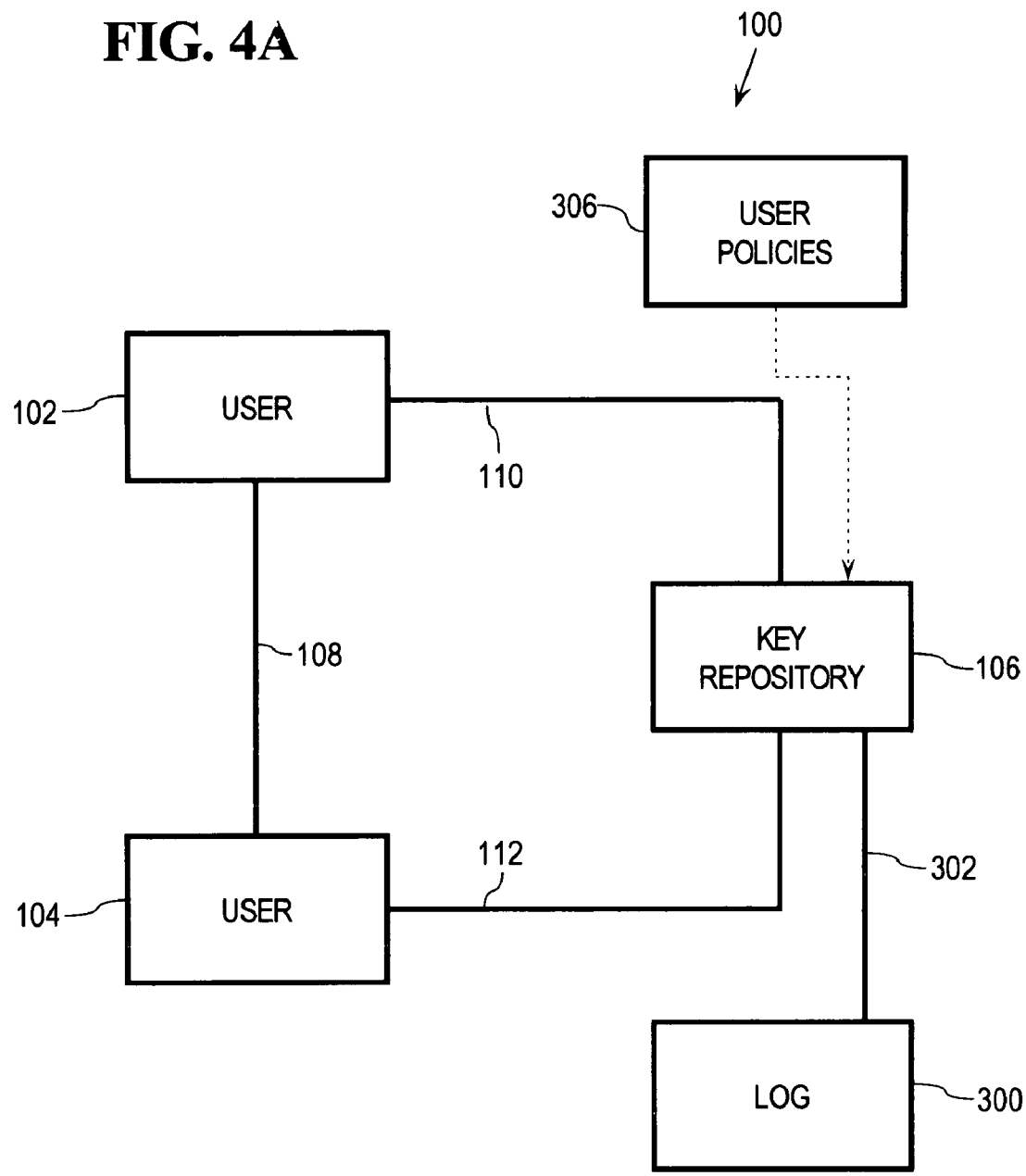
FIG. 4A is a block diagram of a system for controlling and tracking access to disseminated information that includes a log.

FIG. 4A illustrates a system 100 that includes a log 300 that is logically coupled to key repository 106 using a link 302 for tracking key grants and requests. Link 302 may be implemented using any mechanism that provides for communication of data between key repository 106 and log 300. Each time a new key is granted, log 300 is updated to identify, directly or indirectly, the new key, the message ID associated with the new key and the particular user to whom the new key was issued. Further, each time a key is requested and provided to a user, log 300 is updated to indicate that the key has been requested by and provided to the user.

Referring to the prior example, when a new key is granted to user 102 to encrypt the message to be sent to user 104, log 300 is updated to indicate that the new key was issued to user 102 for a particular message. Similarly, when user 104 requests and is granted the key to decrypt the message received from user 102, log 300 is updated to reflect that user 104 requested and was granted the key.

Figure 3B:
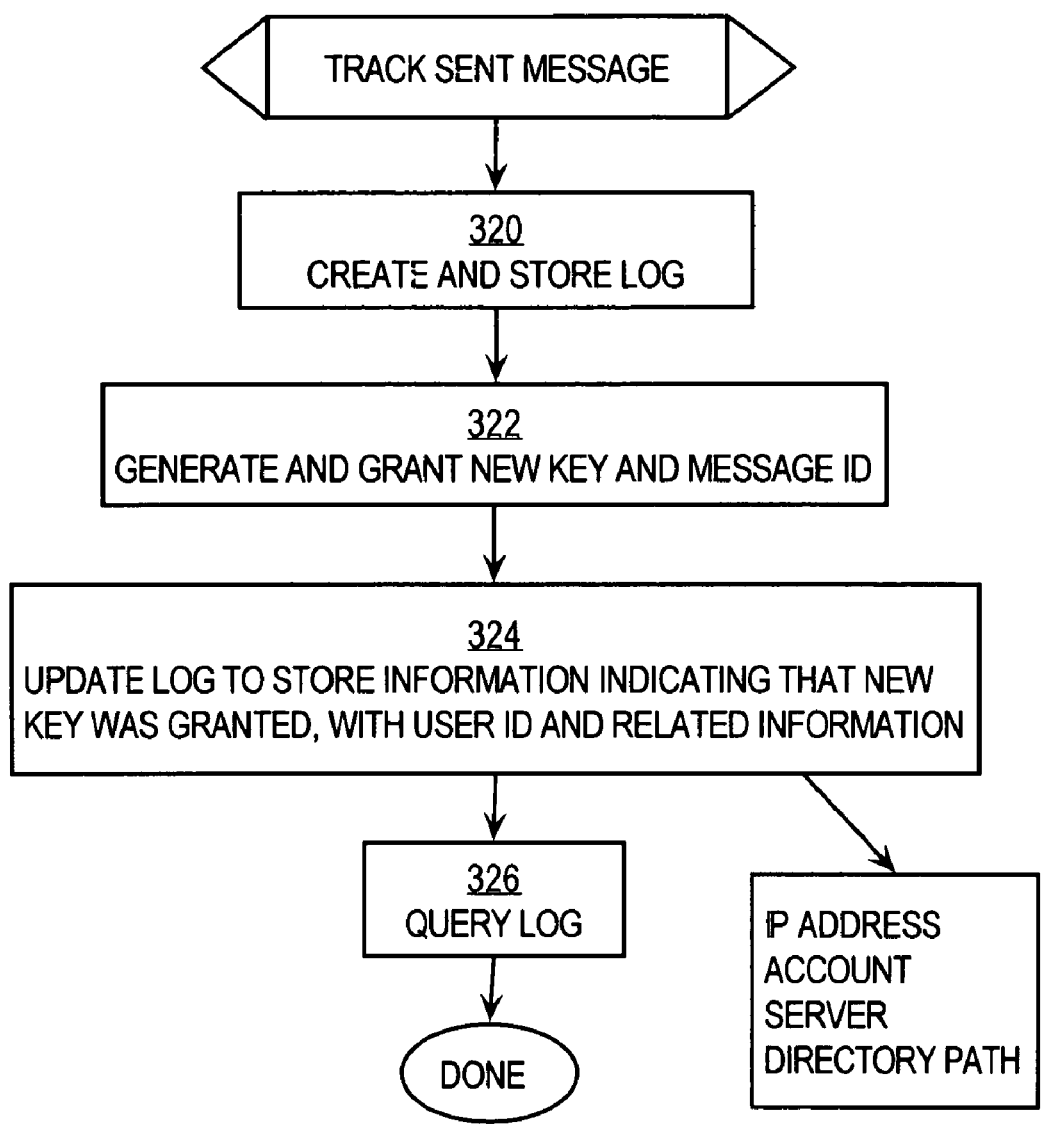
FIG. 3B is a flow diagram of a process of tracking a sent message.

FIG. 3B is a flow diagram of a process of tracking sent messages. In block 320, a log is created and stored. In block 322, the process generates and grants to a requesting user a new key and associated message identifier. Block 322 may be carried out as part of step 3 of FIG. 1, for example. In block 324, the log is updated to store in it information indicating that a new key was granted, along with information identifying the user, and other related information. For example, the log entry may include an IP address of the requesting user, an account name or number associated with the requesting user, a server name, or a directory path of the location in the user's machine where the key was stored, or other machine-specific information In block 326, the log is queried or accessed. The log may be queried as part of block 328 of FIG. 3A, or in other cases when information stored in the log is useful.

The ability to track access to disseminated data according to this approach provides many benefits. For example, all recipients of a particular message that have requested the key for the particular message are known. This includes later recipients to whom the original recipient may have forwarded a copy of the message without informing the original sender. It further includes unintended recipients who have acquired a copy of the particular message and have requested the key to decrypt the message. For sufficiently unique message IDs, entities that have requested the key for a particular message must have received, or otherwise acquired, a copy of the message.

Further, the tracking capability provides a record of the locations where keys have been sent by key repository 106 and may be currently residing. This information is useful when a particular key is deleted from key repository 106 since all copies of the particular key must be deleted to ensure that the corresponding message cannot be decrypted.

For example, in the prior example, log 300 contains data that indicates that a key was issued to user 102 for the message generated by that user. Log 300 also contains data that indicates that user 104 requested the key to the message sent by user 102 to user 104 and that the key was provided to user 104. As previously described, according to the approach, the key issued to user 102 is discarded or otherwise made unusable after user 102 encrypts the message with the key. In addition, user 104 discards the key provided by key repository 106 after user 104 decrypts the encrypted message received from user 102. If the key is deleted from key repository 106, log 300 can be used to identify the locations, in this example user 102 and user 104, where copies of the key may reside. User 102 and user 104 can be contacted to ensure that their copies of the key are deleted.

Using log 300 to track the location of keys also is useful for offline applications as described further below. Another advantage is that when keys are deleted, the corresponding messages are rendered inaccessible but nevertheless continue to consume storage space. Therefore, according to an embodiment, when a key is deleted from key repository 106, the user that generated the message may be notified, or may discover upon polling key repository 106, that the message has been rendered inaccessible, and that the user may delete its copy of the message. Similarly, log 300 may be used to notify users who have previously requested the key, or those users may discover upon polling key repository 106, that the key was deleted so that they may delete their copy of the corresponding message.

Log 300 may be located on the same node as key repository 106. Alternatively, in a distributed arrangement, log 300 may be located on a different node than the node on which key repository 106 resides. Furthermore, although the key tracking functionality provided by log 300 has been illustrated and described as being implemented by the separate log 300, the key tracking functionality may be implemented in key repository 106. Thus, the invention is not limited to the key tracking functionality being implemented in a separate log 300 or as part of key repository 106.

5. Key Management

As previously described in this document, data is rendered inaccessible by deleting all copies of the key used to encrypt the data. The decision to delete keys is generally made according to some specified key policy considerations. Two approaches described for managing keys include the user-based key management approach and the third party key management approach.

A. User-Based Key Management

A user-based key management approach generally involves the user to whom a particular key was granted managing the deletion of the particular key based upon specified key policy criteria. The key policy criteria may include many different types of criteria such as time, subject matter or other classification.

For example, referring to FIG. 4A, assume that user 102 requests and is granted keys for several messages to be sent to other users, as in FIG. 1. User 102 then generates encrypted messages using the keys and sends the encrypted messages to one or more recipients. User 102 later decides to render inaccessible one or more of the disseminated messages according to key policy criteria 306. User 102 renders inaccessible a particular message generated by user 102 by causing the key associated with the particular message to be deleted from key repository 106.

According to one embodiment, user 102 must provide a valid user ID to key repository 106 that is examined by key repository 106 to verify that user 102 was the creator of the particular message. For example, a user ID of the user that requests a message ID and key may be stored as meta data in entries 206 in key data 204 (FIG. 2).

Alternatively, user 102 may render messages inaccessible based upon the subject matter of the messages. For example, user 102 may wish to cause all disseminated messages related to a particular topic to be rendered inaccessible. User 102 instructs key repository 106 to delete the keys for all messages generated by user 102 related to the particular topic. User 102 may instruct key repository 106 to delete keys for messages that user 102 knows are related to the particular topic. Alternatively, user 102 may instruct key repository 106 to delete all keys issued to user 102 relating to the particular topic. In this situation, key server 200 examines the meta data contained in entries 206 to identify and delete keys for messages related to the particular topic.

These are examples of various key policy criteria that user 102 might use to selectively render disseminated messages inaccessible. There are a myriad of other classifications and criteria that may be used and the invention is not limited to rendering messages inaccessible based upon any particular key policy criteria.

B. Third Party Key Management

Figure 4B:
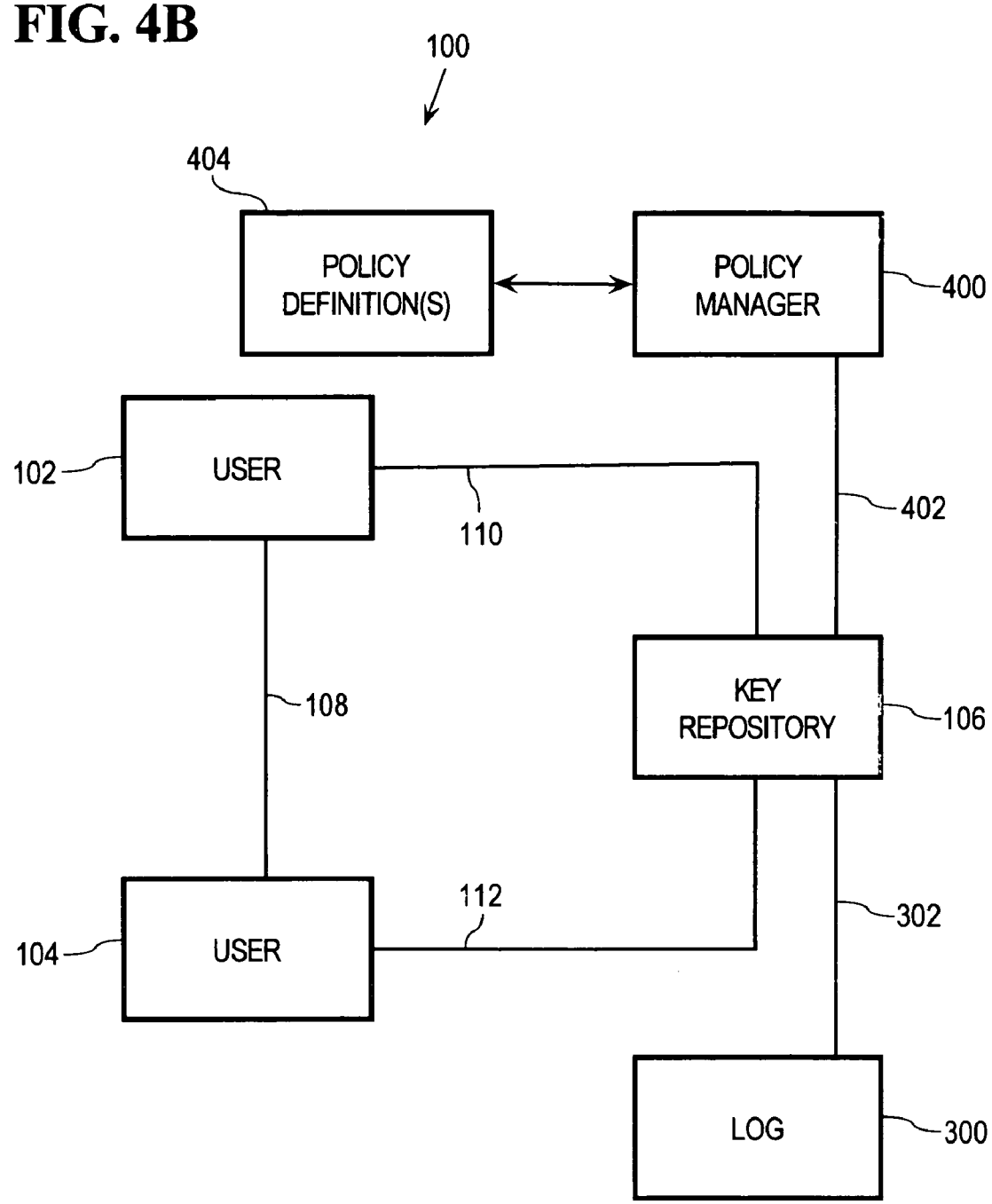
FIG. 4B is a block diagram of a system for controlling and tracking access to disseminated information that includes a log and a policy manager.

A third party key management approach generally involves the use of a third party policy manager to manage access to messages. FIG. 4B illustrates a policy manager 400 logically coupled to key repository 106 via a link 402 for providing third party key management according to an embodiment. Policy manager 400 implements policies used by key repository 106 to control access to messages based upon specified key policy criteria, as previously discussed with respect to user 102. The policies are implemented through communication between policy manager 400 and key repository 106. Each policy is defined by stored information in the form of one or more policy definitions 404 that may be accessed by policy manager 400.

For example, suppose that user 102 is granted a key to encrypt a particular message, as in FIG. 1. User 102 encrypts the particular message to generate an encrypted message and then distributes the encrypted message to several users, including user 104. Policy manager 400 may implement key policy criteria that specify that only user 104 may read the message. This is done by storing a definition of the policy in the policy manager 400, and storing a reference to one of the policy definitions 404 in key repository 106, for example in meta data in key data 204. When a user attempts to read the message by requesting its key from key repository 106, key repository 106 checks whether a reference to a policy definition is stored in association with the requested key. If so, the key repository asks policy manager 400 to provide instructions on how to implement the policy. Policy manager 400 instructs the key repository to grant a key only if the requesting user is user 104.

Figure 4C:
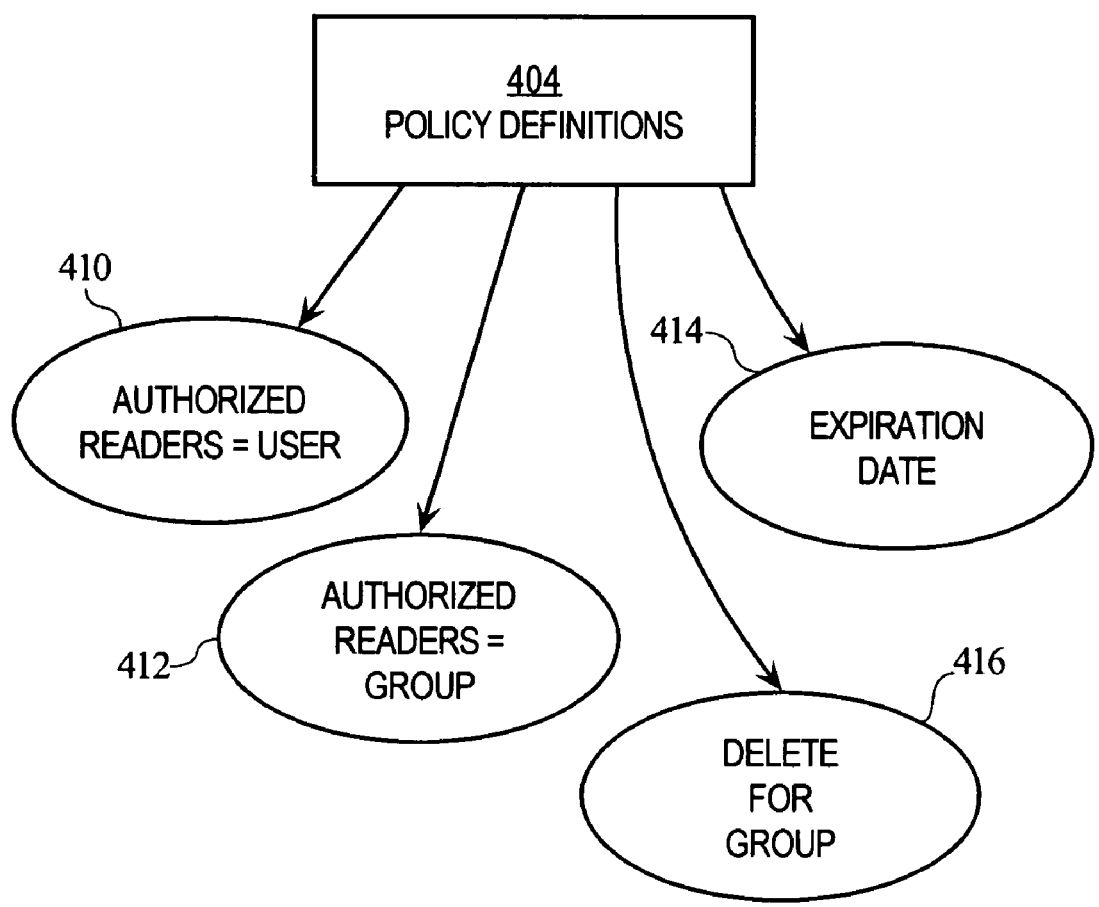
FIG. 4C is a block diagram of types of policies.

Each policy may be defined one of several forms. FIG. 4C is a block diagram of exemplary types of policies. As shown by block 410, one type of policy involves identifying a single user as an authorized reader of a message. Such a policy may be defined and stored in the form of a logical conditional statement that comprises one or more objects joined by one or operators and associated with a result action to be taken. Each object corresponds to a role, user, message, or node.

An example of a policy is shown in block 412, in which authorized readers comprise a group. Such a policy may be defined as, "If message=MESSAGE1", Then AuthorizedReaders={Mathewson, Maris, Mantle}." This policy indicates that only users Mathewson, Maris, and Mantle may read message MESSAGE1. In one embodiment, each policy may be defined and stored using a policy definition tool that is executed by the users 102, 104.

The key policy criteria may also be more complex. For example, the policy criteria may specify that the only users who may read a message are employees of a particular group, or persons having a particular role within an enterprise, or persons having a certain level of authority within the enterprise.

As another example, assume that the key policy criteria specify an expiration date for messages, as shown by block 414. That is, according to the key policy criteria, any message that has a generation time before the specified expiration date is to be rendered inaccessible. In this situation, policy manager 400 can cause the deletion of all keys corresponding to messages that were generated before the expiration date, regardless of which users generated the messages. To accomplish this, policy manager 400 instructs key server 200 to cause all keys corresponding to messages that were generated before the expiration date to be deleted.

Additional information may be required about messages other than message IDs to test against the key policy criteria to know which keys are to be deleted. This information may be stored as meta data in key data 204. Alternatively, this information may be stored in log 300.

User-based key management and third party key management are not mutually exclusive approaches and they may be employed simultaneously. Any key policy criteria can be employed, depending upon the requirements of a particular application, and the invention is not limited to any particular key policy criteria.

According to one embodiment, access and deletion policies are applied to message groups, as shown by block 416. In this embodiment, a plurality of message groups are established and maintained by key repository 106. The message groups may be based upon a variety of factors and subject matter. Messages may then be assigned, either by users 102, 104 or by policy manager 400, to one or more of the established groups. Access and deletion policies may then be applied to the groups of messages. For example, suppose that three subject matter groups A, B and C are established. Existing and new messages may be assigned to the groups based upon attributes of the messages. Various policies may be applied to message groups A, B and C. For example, one policy may specify that only employees of a specified level or higher may access messages belonging to message group A. Another policy may specify that all messages belonging to message group B are to be rendered inaccessible.

Two significant differences between the third party key management approach and the user-based key management approach are that policy manager 400 can control user access to any messages and also can render messages inaccessible. According to the user-based key management approach, a particular user can control which recipients are granted keys to access messages that they generated. Furthermore, the particular user can only cause messages to be rendered inaccessible that were generated by the particular user, and not messages generated by other users.

For example, suppose that user 102 generates a particular message and is granted a key from key repository 106 to encrypt the particular message. User 102 then encrypts the particular message using the key and distributes the encrypted message (called message #4422) to user 104. Suppose further that user 104 also receives an encrypted message from a third user (called message #5678). User 102 cannot control whether user 104 is granted a key to decrypt message #5678, but can control whether user 104 is granted a key to decrypt message #4422. Furthermore, user 102 cannot control whether message #5678 is rendered inaccessible since user 102 was not granted the key for the message #5678. User 102 can, however, instruct key repository 106 to delete the key for the message #4422, rendering message #4422 inaccessible, since the key for message #4422 was granted to user 102.

Policy manager 400 may be located on the same node as key repository 106 or may be located on a different node than the node on which key repository 106 resides. Furthermore, although the third party key management functionality provided by policy manager 400 has been illustrated and described as being implemented by the separate policy manager 400, the third party key management functionality may be implemented in key repository 106. Thus, the invention is not limited to the third party key management functionality being implemented only in a separate policy manager 400 or only as part of key repository 106.

In some situations, it is desirable ensure that certain messages are not rendered inaccessible. According to one embodiment, a message retention policy is employed to ensure that certain messages are not rendered inaccessible. The message retention policy is implemented by separately maintaining keys for messages that satisfy specified retention policy criteria. For example, the retention policy criteria may specify that all messages relating to particular subject matter be retained. In this example, copies of all messages relating to the particular subject matter are stored on a non-volatile storage medium and copies of the associated keys are stored on a backup key repository. A set of special permissions and controls may then be implemented to control access to the backup key repository. Message retention is particularly useful in the context of email, where corporations desire to maintain certain email, for example all email related to a particular litigation.

6. Multiple Key Repository Applications

The approach described in this document is applicable to applications using two or more key repositories. For example, key repository capacity limitations may require that multiple key depositories be used to handle a large number of messages. In other situations, it may be desirable to use several key repositories and logically organize the key repositories by organization, project or subject. For example, a company with three subsidiaries may use a separate key repository for each subsidiary. As another example, a company with five product lines may use a separate key repository 106 for each product line.

It may also be desirable to provide backup key repositories to protect against users deleting the keys for all of the messages those users generated. For example, a disgruntled employee may attempt to delete the keys for all messages that the employee generated in retribution against the employer. Special permissions and controls may be employed to control the deletion of keys from the backup key repositories. Moreover, legitimate key deletion requires that keys be deleted from all key repositories.

Figure 5A:
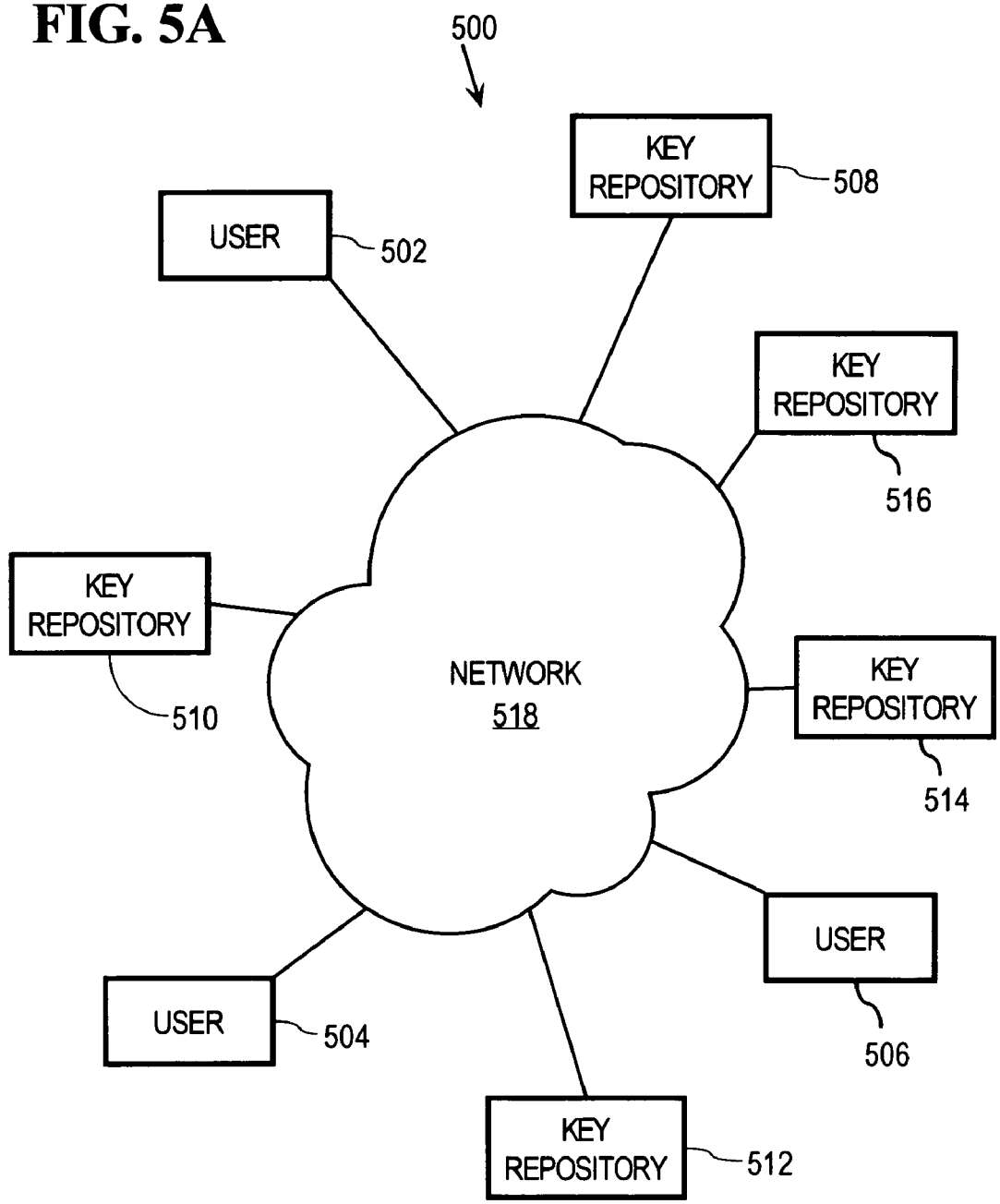
FIG. 5A is a block diagram illustrating an arrangement for controlling and tracking access to data using multiple key repositories according to an embodiment.

FIG. 5A is a block diagram illustrating an arrangement 500 for controlling and tracking access to data according to an embodiment. Arrangement 500 includes users 502, 504 and 506 and key repositories 508, 510, 512, 514 and 516 communicatively coupled to a network 518. Network 518 may be any type of network, for example a local area network (LAN), wide area network (WAN) or event the Internet.

According to an embodiment, for multiple key repository applications, when a user requests a key, the key repository provides a message ID, key and a key repository ID to the user. The user then provides the key repository ID to any other users to whom the encrypted message is sent to that the recipients know which user to query for a key to decrypt the encrypted message.

For example, suppose that user 502 wishes to send an encrypted message to users 504 and 506 according to the approach described in this document. User 502 requests a key from key repository 514. Key repository 514 provides a message ID, a key and a repository ID to user 502. The repository ID specifies that key repository 514 issued the key for the message. User 502 then generates the encrypted message using the key provided by key repository 514. When user 502 provides the encrypted message to users 504 and 506, user 502 also provides the repository ID. When users 504 and 506 wish to decrypt the encrypted message from user 502, users 504 and 506 examine the repository ID provided by user 502 to determine which key repository 508, 510, 512, 514 or 516 has the key for the message. Then users 504 and 506 request the key from key repository 516 to decrypt the encrypted message from user 502.

Figure 5B:
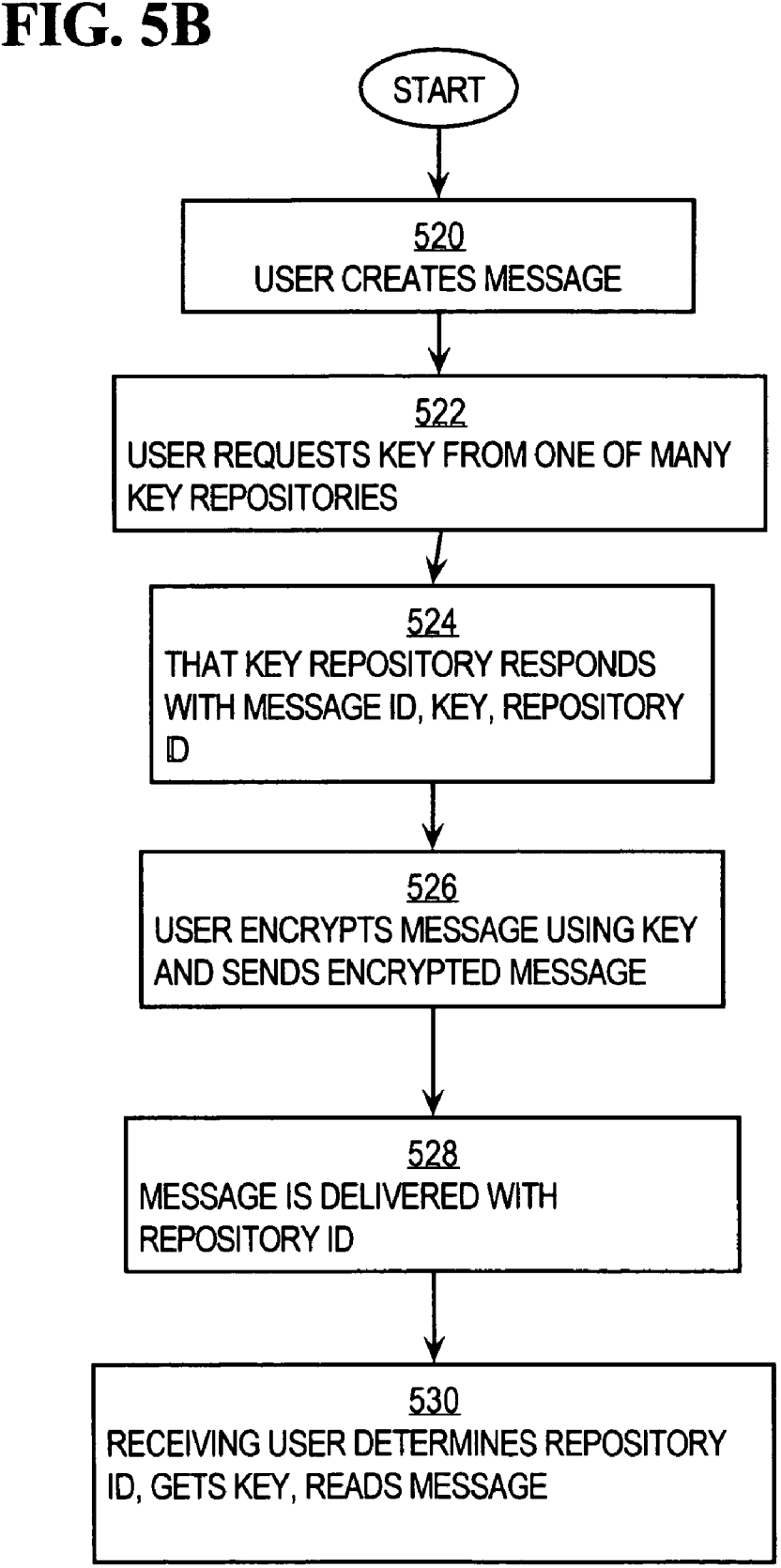
FIG. 5B is a flow diagram of a process of sending a message in association with one of many key repositories.

FIG. 5B is a flow diagram showing a process of creating and sending a message based on multiple repositories.

In block 520, a first user creates a message that is to be sent to a second user. In block 522, the first user requests a key from one of many key repositories. In block 524, the selected key repository responds by providing a new message ID, a key, and an identifier of the repository. In block 526, the user generates an encrypted message and sends the message. In block 528, the message is delivered to the second user with the repository identifier attached to the message or associated with it.

In block 530, the second user determines the repository identifier and contacts that repository to obtain a key for the message. The second user may then read the message.

One or more of the foregoing steps may be carried out in a way that is invisible to the first user, the second user, or both. For example, an email client of the first user may be configured to automatically select one of the repositories and also may generate an identifier of the repository. At the receiving end, an email client of the second user may be configured to automatically determine which repository was used to generate a key, and to contact that repository to obtain the key.

7. Key Layering

In some situations it is desirable to apply the approach described in this document to received messages that were previously encrypted using the approach described in this document. Key layering is one approach for handling messages that have been previously encrypted using the approach described in this document.

The key layering approach generally involves encrypting a message that has previously been encrypted using the approach described in this document, without removing the prior encryption. For example, referring to FIG. 1, suppose that user 104 has received an encrypted message from user 102 according to the approach described in this document. Suppose further that user 104 wishes to immediately forward the encrypted message to another user (not illustrated) without decrypting the message. One approach would be for user 104 to simply forward the encrypted message to the other user without changing the encrypted message.

According to the key layering approach, user 104 encrypts the encrypted message with another key to generate a twice-encrypted message. To accomplish this, user 104 first requests a new message ID and key from key repository 106. User 104 then generates the twice-encrypted message by one of two approaches.

According to the first approach, user 104 encrypts both the encrypted message and original message ID with the new key and then append the new message ID to the twice-encrypted message. Thus, the original encrypted message and original message ID are encapsulated in the second layer of encryption.

According to the second approach, user 104 extracts the original (unencrypted) message ID from the encrypted message, encrypts the original encrypted message with the new key and then appends both the original message ID and the new message ID to the twice-encrypted message. User 104 then forwards the twice-encrypted message to the other user.

Figure 6A:
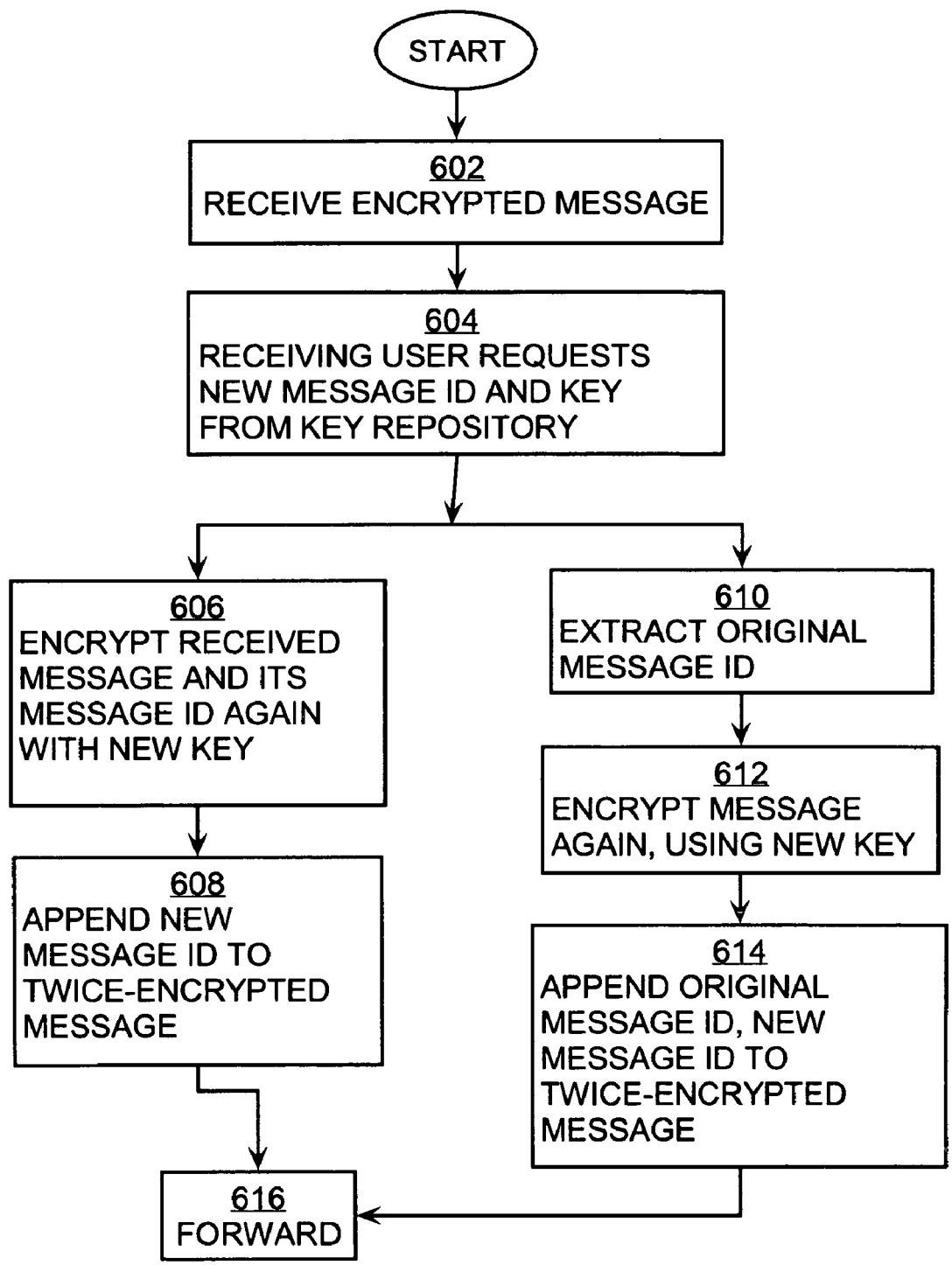
FIG. 6A is a flow diagram of a key layering process.

FIG. 6A is a flow diagram that illustrates these approaches. In block 602, an encrypted message is received by a user. The encrypted message is a message that has been composed and sent by another user of the system, for example, according to the process and system shown in FIG. 1. In block 604, the receiving user requests a new key and message ID from the key repository to be used with the received message.

In the first approach, as shown by block 606, the receiving user encrypts the received message and its message ID again, using the new key. Thus, the received message is now twice encrypted. In block 608, the receiving user appends the new message identifier to the twice-encrypted message. In block 616, the receiving user forwards the message to another recipient.

In the second approach, as shown by block 610, the original message ID is extracted. In block 612, the message is encrypted a second time, using the new key that was obtained in block 604. In block 614, the original message ID and the new message ID both are appended to the twice-encrypted message. In block 616, the message is forwarded.

Figure 6B:
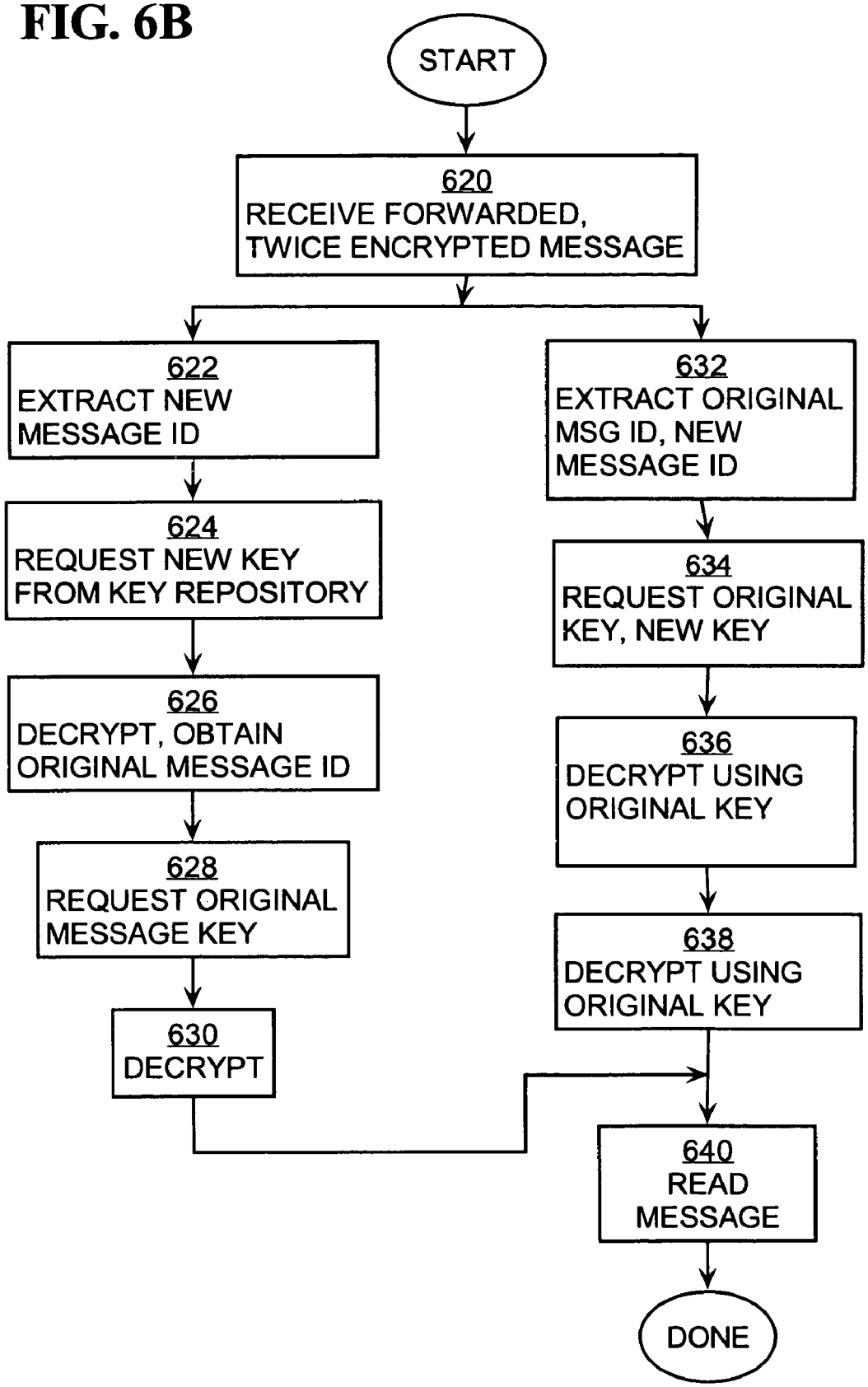
FIG. 6B is a flow diagram of a process of reading a message that has layered keys.

The approach used by a recipient to retrieve the original unencrypted message depends upon which approach user 104 used to generate the twice-encrypted message. FIG. 6B is a flow diagram of two approaches that may be used. In block 620, a user receives the forwarded, twice-encrypted message. If the first approach was used to generate the twice-encrypted message, then as shown in block 622, the recipient extracts the new message ID from the twice-encrypted message. In block 624, the user requests the new key from key repository 106. In block 626, the recipient decrypts the twice-encrypted message using the new key to retrieve the original encrypted message and the original message ID. The recipient then requests the original key from the key repository, as shown by block 628. Once the recipient receives the original key from key repository 106, the recipient decrypts the encrypted message to retrieve the original (unencrypted) message, as shown by block 630.

If the second approach was used to generate the twice-encrypted message, then as shown in block 632, the recipient extracts both the original message ID and the new message ID from the twice-encrypted message. The recipient then requests both the original key and the new key from the key repository, as shown by block 634. The recipient then decrypts the twice-encrypted message using the new key to retrieve the original encrypted message, as indicated by block 636. The recipient then decrypts the original encrypted message to retrieve the original, unencrypted message, as shown by block 638. After carrying out either approach, the receiving user may read the message, as indicated by block 640.

Thus, retrieving a message encrypted using the key layering approach requires that a recipient obtain keys for each layer of encryption from key repository 106 and then remove each layer of encryption using the keys.

The key layering approach provides several advantages over single-key encryption. First, key layering provides additional protection against third party eavesdroppers since layered encryption makes it more difficult for an eavesdropper to retrieve the original message. Specifically, an eavesdropper must either obtain all of the keys or expend a large amount of computational resources to determine the keys.

Second, key layering adds control over rendering of messages inaccessible to the entity that that caused the last, outer-most layer of encryption to occur. In the prior example, suppose that user 104 receives an encrypted message from user 102 but does not also encrypt the message. Since user 102 generated the encrypted message, user 102 has control over rendering the encrypted message inaccessible, since user 102 controls whether the corresponding key contained in key repository 106 is deleted. Key repository 106 and policy manager 400 may also have control over this key, but that is not important for this example. What is important is that if user 104 does not further encrypt the encrypted message received from user 102, then user 104 does not have control over rendering the encrypted message inaccessible. In this situation, if user 104 wants the encrypted message to be rendered inaccessible, user 104 must rely upon user 102. This aspect of the invention is very important in many applications.

For example, consider the situation where companies A and B have separately implemented the approach described in this document for controlling and tracking access to disseminated information. Suppose that company A regularly receives a large number of encrypted messages from company B that were generated using the system of company B. If company A wishes one or more of these encrypted messages to be rendered inaccessible using the approach described in this document, the corresponding keys must deleted from company B's key repository. As a result, company A must rely upon company B to delete the corresponding keys from its key repository for encrypted messages that company A wants to be rendered inaccessible.

The key layering approach can resolve this problem by giving company A control over rendering inaccessible the encrypted messages received from company B. Company A implements key layering for some or all of the encrypted messages received from company B. This guarantees that company A can render inaccessible the key-layered messages by deleting the corresponding keys from company A's key repository. In this situation, A cannot control rendering inaccessible messages that A did not encrypt. The key layering approach may be used to add any number of new encryption layers to any number of existing encryption layers and the invention is not limited to a specific number existing layers or a specific number of new layers.

8. Re-Keying

Re-keying is another approach for handling messages that have been previously encrypted using the approach described in this document. In general, re-keying involves substituting one or more prior layers of encryption with one or more different layers of encryption.

Referring to FIG. 1, suppose that user 104 receives an encrypted message from user 102 according to the approach described in this document. According to the re-keying approach, user 104 first requests the original key from key repository 106 and decrypts the encrypted message to retrieve the original (unencrypted) message. User 104 then obtains a new message ID and key from key repository 106 and generates a new encrypted message using the new key. User 104 then forwards the new encrypted message to the other recipient. Thus, the re-keying approach causes the original layer of encryption to be removed and replaced with a new layer of encryption.

Figure 6C:
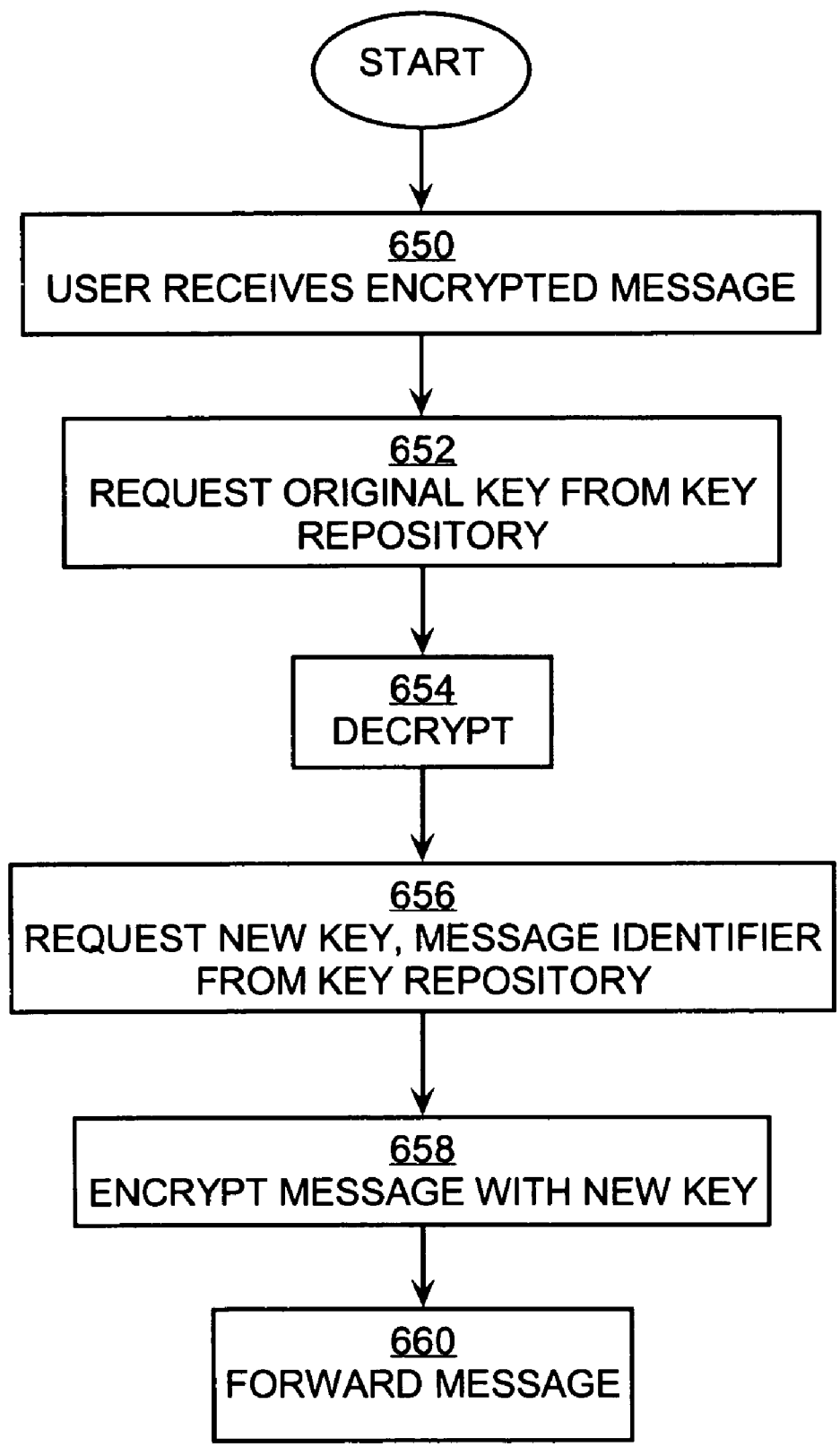
FIG. 6C is a flow diagram of a process of re-keying a message.

FIG. 6C is a flow diagram of a process of re-keying a message. In block 650, a user receives an encrypted message. In block 652, the user requests the original key from the key repository. In block 654, the user decrypts the received message using the original key, yielding cleartext.

In block 656, the user requests a new key and message ID from the key repository. In block 658, the user encrypts the message with the new key, and may then forward the message as shown by block 660. One or more of the foregoing steps may be implemented in a way that is invisible to the receiving user. For example, the receiving user may execute an email client that carries out the foregoing steps when the user selects a "forward" or "reply" function for a particular message.

Re-keying encrypted messages provides several benefits. First, changing the encryption key makes it more difficult for an eavesdropper to recover the original (unencrypted) message. For example, an eavesdropper who has intercepted or computationally determined the original key now must obtain the new key.

Second, re-keying transfers control over rendering messages inaccessible to the entity that that caused the last (outer-most) layer of encryption to occur. In the prior example, user 104 has control over rendering the encrypted message inaccessible since the original encryption was replaced with the encryption initiated by user 104. However, re-keying also provides control over access to the encrypted message. With the key layering approach, retrieving the original (unencrypted) message requires all of the keys used to provide all of the layers of encryption. If a user with control over one of keys causes one of the keys to be deleted from a key repository, then the original (unencrypted) message cannot be retrieved. This risk is eliminated by the re-keying approach since the prior layers of encryption are removed and a new layer of encryption is added.

Consider the prior example of company A receiving encrypted messages from company B. Company A may use the re-keying approach to replace one or more encryption layers applied by company B with one or more of its own encryption layers. This allows company A to both control access to encrypted messages and render encrypted messages inaccessible. It should be noted that the re-keying approach may be used to substitute any number of prior encryption layers with any number of new encryption layers and the invention is not limited to using a specific number of layers.

9. Offline Applications

The invention is applicable to offline applications where a user wishes to view messages while not communicatively coupled to key repository 106. For example, a user may wish to use a portable computer to view encrypted messages.

According to an embodiment, a user obtains and stores keys from one or more key repositories for messages that the user wishes to view while decoupled or disconnected from the one or more key repositories. For example, a user may request all keys issued to the user by any key repository, allowing the user to view any messages generated by the user. The user may also request all keys for messages received by the user, allowing the user to view any messages received by the user. This assumes that the user has downloaded the encrypted messages to the offline system. The keys may be stored locally on volatile or non-volatile storage. The user can then decrypt any messages for which the user obtained the required key.

Referring to FIG. 4A, suppose that user 102 plans to disconnect from key repository 106 but wishes to read several encrypted messages stored locally on user 102. User 102 obtains and stores keys from key repository 106 for any messages that user 102 would like to view. Log 300 is used to track which keys were sent to user 102. Then, even though user 102 has disconnected from key repository 106, user 102 may still decrypt messages for which user 102 had previously obtained the corresponding keys.

One of the potential problems with offline applications is that keys removed from the issuing key repository are no longer controlled by the issuing key repositories and may be used by any entity that obtains the keys. As a result, deleting a particular key from a key repository does not guarantee that the corresponding message cannot be decrypted, since a copy of the key may reside on an offline user. Furthermore, the keys obtained by the user can be distributed to other users when the user reconnects to a network.

Therefore, according to an embodiment, a particular offline user is configured so that when the particular offline user reconnects to a key repository, all of the offline user's locally-stored keys are deleted. According to an embodiment, keys stored offline are stored securely, to prevent, or at lest reduce the likelihood that, an unauthorized user can obtain the keys. For example, offline keys may be stored in an encrypted block protected by a password known only to the user. As another example, offline keys may be stored in a volatile RAM card that can be erased by disconnecting power. As a further example, offline keys may be stored in a smart card that is removed and kept with the user.

FIG. 7A is a flow diagram of a process of reviewing messages offline. In block 702, a user receives one or more messages that have been created using the system of FIG. 1. The user is, or is associated with, a transportable computer, such as a laptop computer, that is connected to a network in the system of FIG. 1.

In block 704, the user requests, receives, and locally stores all keys from the key repository that correspond to all the messages that were received in block 702. In block 706, the user logically decouples or disconnects itself from the key repository so that it can no longer communicate information between itself and the key repository.

In block 708, the user reads the messages. This may be carried out using a portable computer, or the equivalent, which is disconnected from the network in which the system of FIG. 1 is implemented. In block 710, the user is re-connected to the key repository. In block 712, the keys are deleted. Block 712 may involve deleting the keys that are locally stored at the user, as well as corresponding keys in the key repository.

10. Message Verification

In some situations there are concerns about whether a message has been altered, either intentionally or unintentionally. It is desirable to ensure that the sender of a message cannot repudiate it, and to ensure that a receiver or intercepting party cannot modify the content of the message without the knowledge of the sender. Therefore, according to an embodiment, a message "fingerprint" is provided to recipients of messages so that a determination can be made whether a message has been altered.

Each message fingerprint is a stored value that uniquely represents the content of the message. Message fingerprints may be generated in a variety of ways, and the invention is not limited to a particular way of generating message fingerprints. For example, a message fingerprint may be generated using a one-way hash function based upon the content of a message. The MD5 hash function is suitable for this purpose. A message fingerprint may be a digital signature. It may be a digital certificate, such as a digital certificate that is compatible with the X.509 standard of the ITU. Message fingerprints may be generated based upon other information such as message timestamps or passwords.

Message fingerprints may be provided with a message when a message is transmitted to recipients. Alternatively, message fingerprints may be stored on a key repository with the corresponding key for the message. Message fingerprints can then be provided to message recipients when the recipients request a key from the key repository.

FIG. 8 is a block diagram of a message processing system 100. Generally, system 100 has the same structure and functions as the system of FIG. 1.

However, in FIG. 8, a digital signature of a message is generated at step 4, at the time that user 102 encrypts the message based on the message ID and key that are received from key repository 106 over link 110. In step 5, the encrypted message is sent, along with its message ID and the digital signature, over link 108 to user 104. In step 9 of FIG. 1, after the message is decrypted, the message contents are validated by comparing them to the digital signature. The process used for validation depends on the type and form of the digital signature. For example, if the digital signature is a hash value, then the validation process may involve applying a hash function to the content, generating a second hash value, and comparing the two hash values. If there is a match, then the content is unchanged.

11. Message Declassification

In some circumstances, it may be desirable to "declassify" an encrypted message by allowing the encrypted message to be read by any user.

According to one embodiment, a message is declassified by making the key available to any user that requests the key. This effectively removes any permissions and/or controls established by the key policy criteria that may have previously controlled the distribution of the key.

Figure 7B:
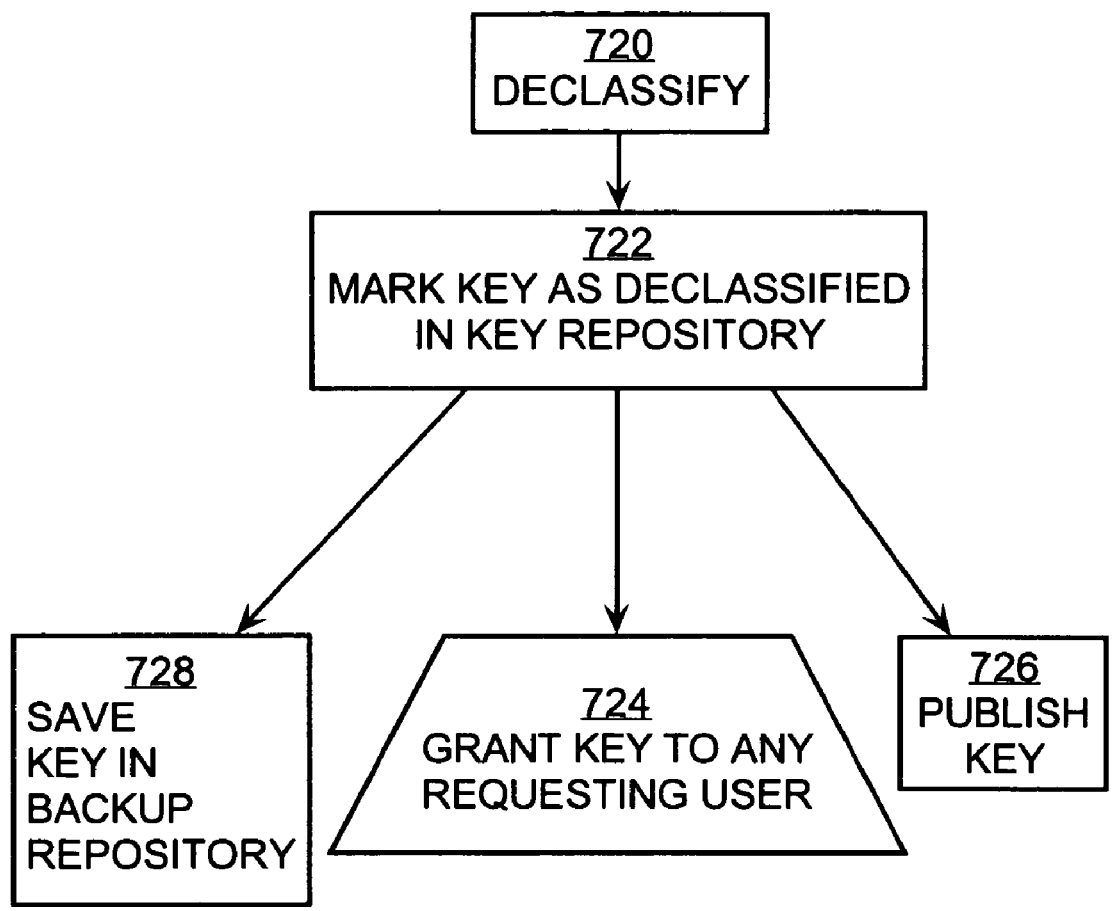
FIG. 7B is a flow diagram of a process of declassifying message keys.

FIG. 7B is a flow diagram of a process of declassifying a key. In block 722, the key to be declassified is marked, in the key repository, as declassified. The marking may involve setting a flag bit, storing an identifier of the key in a table, or other methods. In block 724, the key is granted to any requesting user, regardless of whether a user-defined policy or policy manager indicates that the key should not be granted.

The key may also be published at a location other than key repository 106 that is readily accessible to users, as shown by block 726.

In addition, the key may be saved to a backup key repository, as indicated by block 728, to ensure that the key can be made available should the key be inadvertently deleted from key repository 106.

12. Message Repository Applications

According to another embodiment, an approach is provided for controlling and tracking access to information using a message repository approach. According to the approach, when a user wants to send a message to a recipient, the user generates the message and then sends the message to a specified location. The user then notifies the recipient that a message has been generated for the recipient and can be retrieved from the specified location. The recipient then retrieves the message from the specified location. Various policy controls may be applied to control access to and deletion of the message from the specified location.

Figure 9:
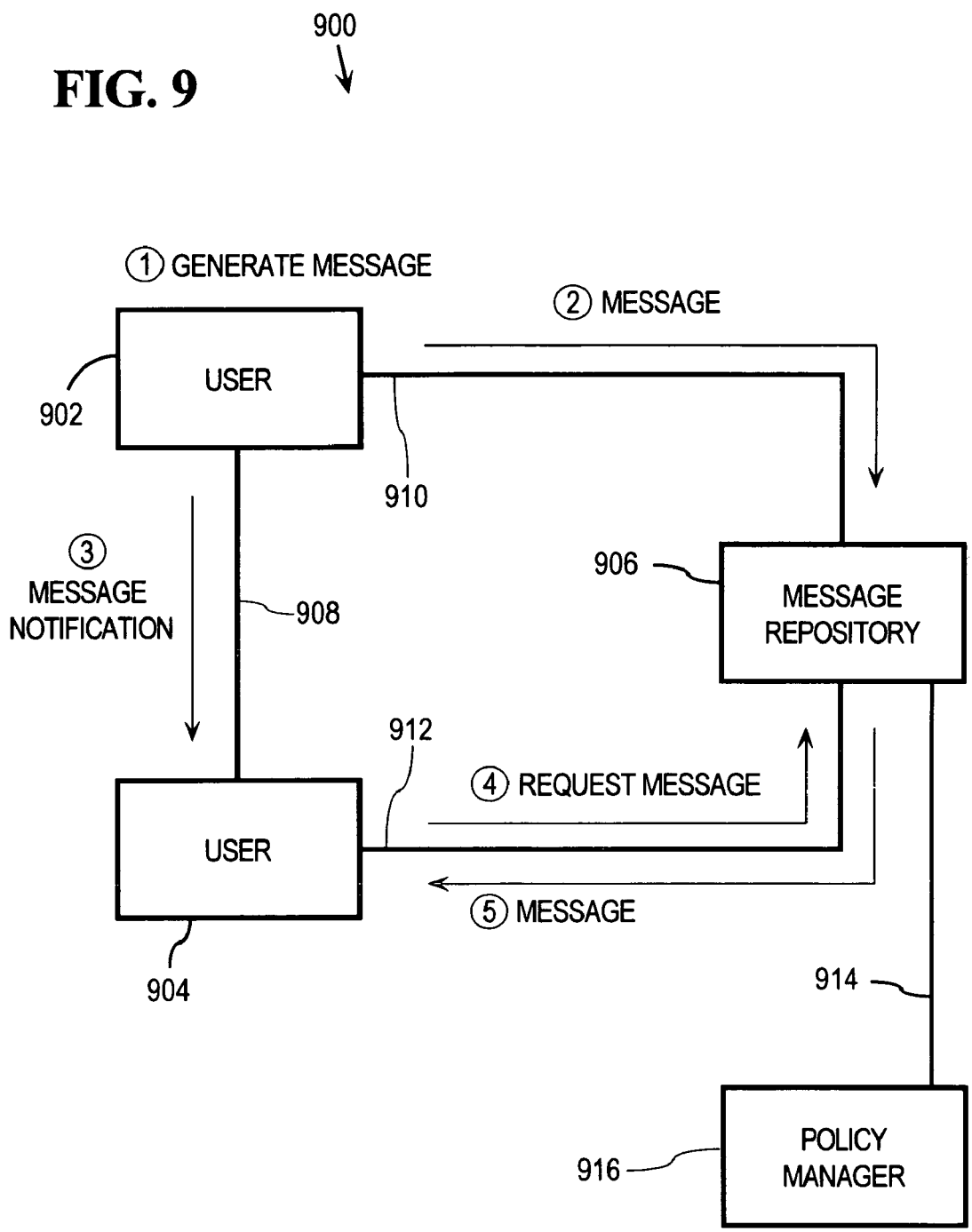
FIG. 9 is a block diagram illustrating an arrangement for controlling and tracking access to data using a message repository according to an embodiment.

FIG. 9 is a block diagram illustrating a system 900 for controlling and tracking access to disseminated information according to the message repository approach. System 900 includes users 902, 904 and a message repository 906. Users 902, 904 are logically coupled by and can communicate using a link 908. User 902 and message repository 906 are communicatively coupled via a link 910. User 904 and message repository 906 are communicatively coupled via a link 912. Links 908, 910, 912 may include several connections, networks, or internetworks. For example, link 908 may include an Internet connection. Thus, users 902, 904 and message repository 906 may be located on the same node or on different nodes in a distributed arrangement. The invention is not limited to any particular implementation of links 908, 910, 912.

Suppose that user 902 wishes to send a message to user 904. According to the approach, user 902 first generates the message and then sends the message to message repository 906. User 902 may choose to encrypt the message before sending the message to message repository 906 and the invention is not limited to either encrypting or not encrypted the message sent to message repository 906. User 902 then notifies user 904 that a message has been generated for user 904 and indicates to user 904 the location of the message. In the present example, user 902 notifies user 904 that a message is waiting for user 904 at message repository 906. Thus, according to the approach, user 902 does not actually send the message to user 904, but instead sends a notification to user 904 that the message is available from message repository 906.

When user 904 is ready to view the message, user 904 requests the message from message repository 906. User 904 may be required to provide information to message repository 906 to verify that user 904 authorized to receive the message. For example, user 904 may be required to provided a unique identification to message repository 906 so that message repository 906 knows that user 904 is authorized to receive the message. Once message repository 906 is satisfied that user 904 is authorized to receive the message, message repository 906 provides the message to user 904. The message may be in either encrypted form or unencrypted form. Thus, the message may be stored in message repository 906 in unencrypted form and directly provided to user 904. Alternatively, the message may be stored at message repository 906 in encrypted form and provided to user 904 either in encrypted form or decrypted form.

A policy manager 916 is communicatively coupled to message repository 906 via a link 914. Policy manager 916 is used to implement various policies for controlling access to and deleting messages stored in message repository 906. For example, a particular policy may specify that users having certain user attributes may access certain messages. This is applicable to original recipients, as well as secondary recipients that receive forwarded messages. The user attributes may take many forms. For example, a user attribute may be a permission, membership in a group, or any other information. Access to and deletion of messages may also be managed based upon certain message attributes. For example, it may be desirable to delete all messages contained in message repository 906 that are associated with a particular subject or class, e.g., "tagging" groups of messages based upon message attributes. Message attributes may be specified by meta data maintained in message repository 906 for messages maintained in message repository 906. As previously described herein, user policy criteria may also be used to control access to and delete messages maintained in message repository 906.

The approach is not limited to messages maintained in only message repository 906 and is applicable to messages maintained at any location. Numerous message repositories 906 may be used to store messages based upon either user or message attributes. For example, messages may be stored in message repositories 906 based upon message subject. Message repositories 906 may be located on different nodes than users 902, 904.

The approach is also applicable to systems 900 implemented using the Internet. For example, a recipient may be notified that a message is available for the recipient and the recipient provided with a uniform resource locator (URL) that specifies the location of the message for the recipient. The recipient may then use a browser to retrieve the message from the specified location. Thus, a recipient may retrieve different messages from the same location, or from different locations and the invention is not limited to messages being stored at a single location or at multiple locations.

Figure 10:
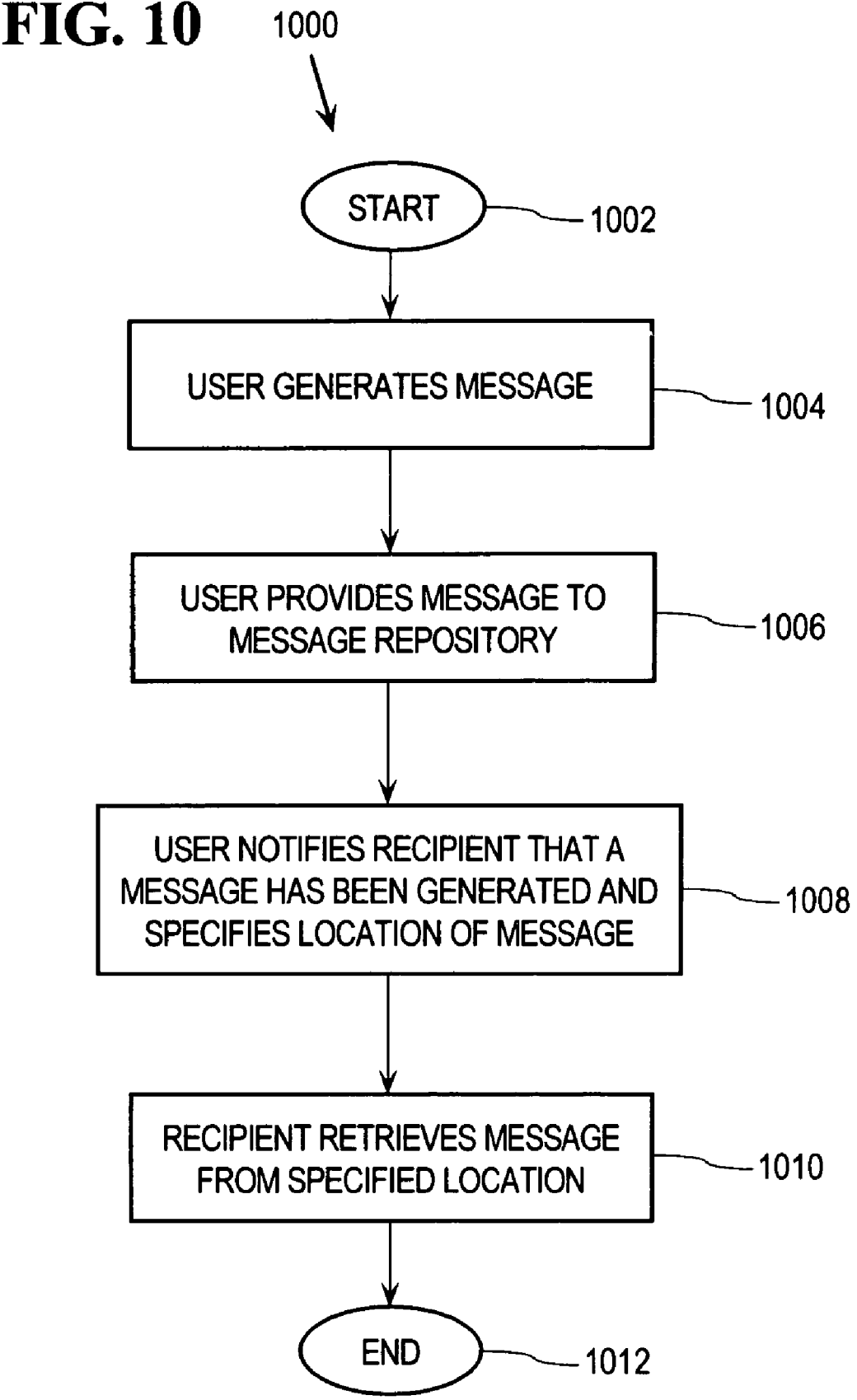
FIG. 10 is a flow diagram of a process for controlling and tracking access to data using a message repository according to an embodiment.

FIG. 10 is a flow diagram 1000 illustrating a process for controlling and tracking access to data using the message repository approach. After starting in step 1002, in step 1004, a user generates a message. In step 1006, the user provides the message to a message repository. The message repository may reside locally to the user or may reside remotely, for example in a distributed arrangement.

In step 1008, the user notifies the recipient that a message has been generated for the recipient and specifies the location where the message resides. In step 1010, the recipient retrieves the message from the specified location. As previously described, the recipient may be required to provide verification that the recipient is authorized to retrieve the message. The process is complete in step 1012.

13. Dynamic Encoding Algorithms

As previously described herein, users 102, 104 encode and decode messages, respectively, using keys issued and maintained by key repository 106. Any type of encoding algorithm may be used, and the particular algorithm employed may vary depending upon the requirements of a particular application. As with conventional protection schemes that rely upon the use of an encoding algorithm to protect data, there is always a risk that the algorithm is discovered or "cracked" by an unauthorized entity.

According to one embodiment of the invention, encoding algorithms are dynamically changed over time. This approach may be implemented in many different ways, depending upon the requirements of a particular application. For example, users 102, 104 may negotiate that a particular algorithm is to be used to encode all messages exchanged between them. Sometime later, users 102, 104 negotiate that a different algorithm is to be used to encode messages exchanged between them. Users may negotiate different algorithms to be used with specific users or messages. Thus, different algorithms may be used between different sets of users depending upon what the member users of those sets negotiate among themselves. The frequency at which algorithms are changed may also be separately negotiated between users. The frequency may vary depending, for example, upon the perceived risk of intrusion by unauthorized third parties, the content of the messages being transmitted, or both.

According to another embodiment of the invention, user 102 generates and provides to user 104, encoding identification data that identifies a particular encoding algorithm used to encode one or more messages. The encoding identification data may be used with a previously agreed upon mapping to determine a particular encoding algorithm to be used. This may reduce the usefulness to a third party who intercepts the encoding identification data. User 104 examines the encoding identification data to determine which algorithm is to be used by user 104 to decode one or more messages received from user 102. User 102 may further specify that the algorithm identified in the encoding identification data is to be used with one or more specific messages, or with all messages until further notice. Thus, the encoding identification data may be message-specific, or may be used for any number of messages. The encoding identification data may be sent with an encoded message, such as the first encoded message that was encoded using the algorithm, or may be sent separate from any messages.

According to another embodiment of the invention, encoding identification data is generated and maintained at key repository 106. In this situation, the encoding identification data may be generated by key repository 106 or by another entity (not illustrated). With this approach, key repository 106 may select an encoding algorithm to be used with a particular key by providing the encoding identification data to both users 102, 104. As with the prior approach, key repository 106 may assign a different algorithm to be used with each key, or may assign a single algorithm to multiple keys.

There may be situations where user 104 does not have access to an algorithm required to decode an encoded message. This may occur for example, if user 104 does not have access to a more recent version of an algorithm used by user 102 to encode a message. Therefore, according to another embodiment of the invention, algorithm location data is generated and provided to user 104. The algorithm location data specifies where user 104 may obtain an algorithm to decode an encoded message using a key from key repository 106. The form of the algorithm location data may vary depending upon the requirements of a particular application. For example, in the context of the Internet, the algorithm location data may specify a URL of an algorithm. User 104 may then download the algorithm and use it to decode messages from user 102. The algorithm downloaded by user 104 may take many forms and the invention is not limited to any particular form. For example, user 104 may download a self-executing data file that will decode messages for user 104. As another example, user 104 may download a plug-in for the client associated with user 104. These approaches are described in more detailed hereinafter in the inline message decryption section.

Using dynamic algorithms as described herein improves the effectiveness of the approach described herein for disseminating information for several reasons. First, changing the encoding algorithm makes it more difficult for an unauthorized party to crack the current algorithm used by a user. By the time a particular algorithm has been cracked, a different algorithm may have been selected. Second, this approach limits the number of messages that can be decoded with any particular algorithm, even if an algorithm is successfully cracked.

14. Inline Message Decryption

It is sometimes desirable to enable a user to view a message encoded according to the various embodiments described herein without the user's client having to be aware of the particular encoding algorithm used to encode the message. According to the inline message decryption approach, an encoded message is provided to a user in a form that enables the user's client to process the encoded message using conventional client tools and obtain the cleartext message. This eliminates the need for a user's client to be aware of the particular encoding algorithm used to encode the message. Various embodiments of the inline message decryption approach are described in the following sections: a) in-situ decryption; b) remote decryption; and c) data uploading.

A. In-Situ Decryption

According to the in-situ decryption approach, a message containing embedded code is sent to a recipient. When the recipient's client processes the embedded code, an encoded message contained in the embedded code is automatically decoded and the cleartext message displayed to the recipient. This approach may be implemented with any type of messaging system client, such as Microsoft Outlook.

Figure 11:
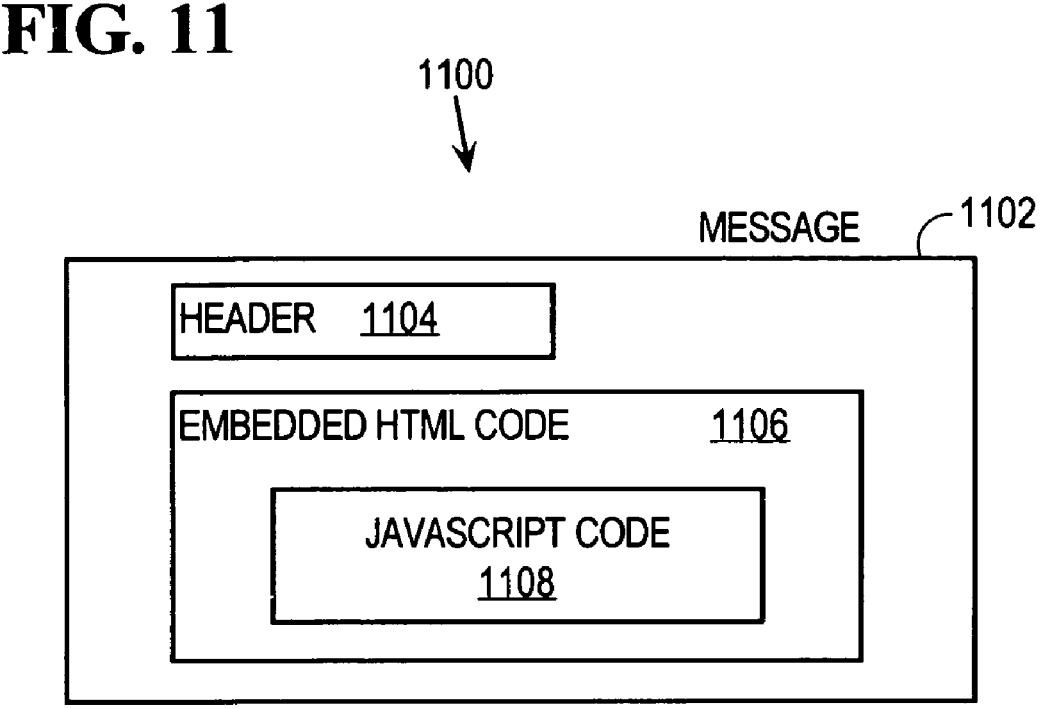
FIG. 11 is a block diagram of a message format for providing in-situ decryption of messages according to an embodiment.

FIG. 11 is a block diagram of a message format that can be used to provide in-situ decryption according to an embodiment. A message 1102 received by a user includes a header 1104. Header 1104 is data that specifies contents of message 1102. In the present example, message 1102 includes embedded hypertext markup language (HTML) code 1106. When message 1102 is received at the user's client, a client process, such as a generic Web browser, attempts to process embedded HTML code 1106 within a message display window of the client. In the present example, embedded HTML code 1106 includes JavaScript code 1108. JavaScript code 1108 includes a data object, key address data and an executable algorithm.

The data object embodies the encrypted message. For example, the encrypted message text may be packaged as a variable within JavaScript code 1108. The key address data specifies a retrieval location for a key to decode message 1102. An example of key address data is the URL of key repository 106. The executable algorithm decrypts the message contained in the data object, using the key that is retrieved using the key address. According to one embodiment, the output of the executable algorithm is plaintext of the message.

In this configuration, when the client process processes embedded HTML code 1106, the client process encounters and attempts to process JavaScript code 1108. Processing JavaScript code 1108 causes the client process to retrieve the key using the key address data and decode the data object using a decryption algorithm embodied in JavaScript code 1108. The result of this processing is that the data object is decoded and the original message is recovered. JavaScript code 1108 may also include code which, when processed by the client process, causes the original message to be displayed on the client in plaintext form.

Figure 12:
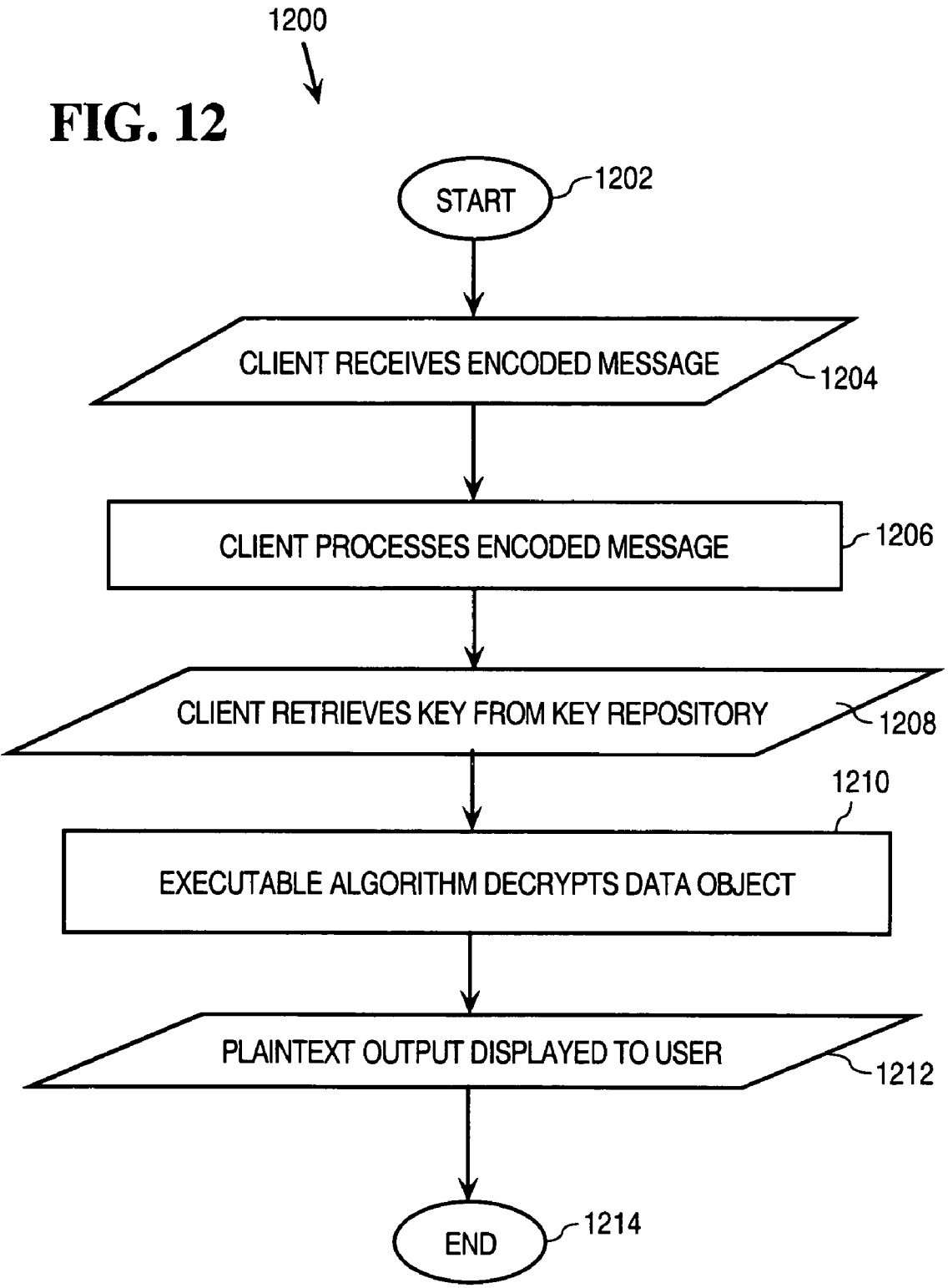
FIG. 12 is a flow diagram that illustrates an approach for performing in-situ decryption of messages according to an embodiment.

FIG. 12 is a flow diagram 1200 that illustrates an approach for performing in-situ decryption using a message format illustrated in FIG. 11, according to one embodiment. Reference is also made to block diagram 100 of FIG. 1. After starting in step 1202, in step 1204, user 104 receives an encoded message 1102 from user 102. In step 1206, user 104's client processes encoded message 1102 by examining header 1104 and processing Javascript code 1108. In step 1208, processing Javascript code 1108 causes a key to be retrieved from key repository 106. In step 1210, the executable algorithm contained in Javascript code 1108 uses the retrieved key to decrypt the data object contained in Javascript code 1108. In step 1212 the plaintext output of decrypting the data object is presented to user 104. The process is complete in step 1214.

This approach is not limited to the use of JavaScript code. In an alternative embodiment, embedded HTML code 1106 may contain a Java applet or download a Java applet from a remote source. The Java applet, when executed locally within the client process then causes the client process to retrieve the key using the key address data and to decode the data object using a decryption algorithm embodied in Java applet. The result of this processing is that the data object contained in embedded HTML code 1106 is decoded and the original message is recovered. The Java applet may also include code which, when processed by the client process, causes the original message to be displayed on the client in plaintext form.

B. Remote Decryption

According to another embodiment, decryption of encrypted messages is performed remotely from the client that receives the encrypted message. A decryption algorithm is located on and executed by the key server or another remote server, e.g., in a server-side script. The client can employ various means to transfer the encrypted message content and encryption key identifier (message ID) to the remote server for decrypting. Once the remote server has successfully decrypted the message, it returns cleartext of the message to the client. The client process, i.e. the browser or an HTML compliant email client, renders or displays the cleartext. For example, the cleartext may be displayed in a separate browser window that pops up on the client computer in response to submitting an HTML form containing the encrypted message data and encryption key identifier to the remote server.

Figure 13:
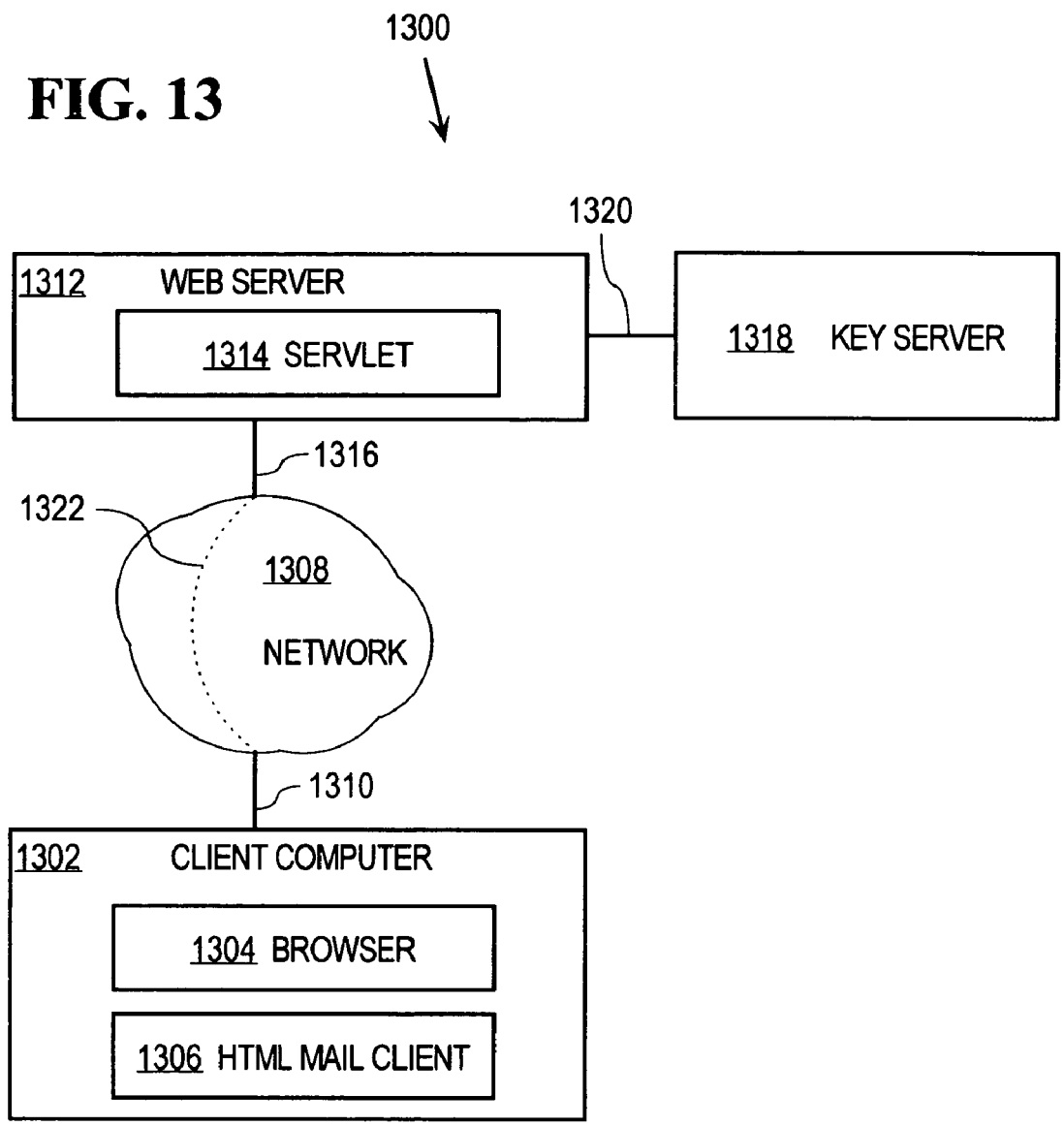
FIG. 13 is a block diagram of an arrangement for performing remote decryption of messages according to an embodiment.

FIG. 13 is a block diagram of an arrangement 1300 for performing remote decryption of messages according to an embodiment. A client computer 1302 executes a browser 1304 and an HTML mail client 1306. In one embodiment, client computer 1302 is a personal computer or workstation. Browser 1304 may be any generic World Wide Web browser program, e.g. Microsoft Internet Explorer, Netscape Communicator, etc. HTML mail client 1306 is an HTML-enabled email communication program, e.g. Microsoft Outlook, Netscape Messenger, Eudora, etc. Client computer 1302 is communicatively coupled to a network 1308 via a link 1310. Network 1308 may be any type of network such as one or more local area networks, wide area networks, inter-networks, etc., or a global, packet-switched network such as the Internet.

Web server 1312 executes a servlet 1314 and is communicatively coupled to network 1308 by a link 1316. As used herein, the term "servlet" refers to a Java code executing within a Web server environment, but this embodiment is not limited to the use of Java or any particular programming language. Web server 1312 communicates with client computer 1302 over a logical path 1322 using HTTP or HTTPS.

Web server 1312 is communicatively coupled to a key server 1318 by a link 1320. Links 1310, 1316, 1320 may be any type of communications link or medium that allows for the exchange of data and information between their respective end points. According to one embodiment, a highly secure communications protocol is used with link 1320. One example of a highly secure communications protocol is Disappearing Inc.'s Key Protocol (DIKP). Another example of a highly secure communications protocol is HTTPS. Web server 1312 communicates with key server 1318 over link 1320 using such a proprietary or standard protocol to provide enhanced security for data exchanged between Web server 1312 and key server 1318.

In one embodiment, the client transfers the encrypted message data and the encryption key identifier by means of an HTML attachment that is associated with message 1102. The HTML attachment contains an HTML form with several hidden fields and a single "submit" button labeled "View Message." The hidden fields contain the encrypted message data, the encryption key identifiers associated with the message, and meta data such as header information associated with the message. When the form is submitted, these data are sent to Web server 1312 and Web server 1312 sends back the cleartext of the message along with the message headers. In one embodiment, Web server 1312 delegates the processing of this data to servlet 1314 which may be Java code embedded in the Web server. The HTML attachment also contains JavaScript to automatically submit the form as soon as it is displayed. Further, it contains some explanatory text to tell users without JavaScript support to click the "View Message" button to see the message. This HTML attachment associated with message 1102 can be opened through the HTML mail client 1306 or it can be opened directly in browser 1304. In addition, the HTML attachment can be opened through a non-HTML email client (not illustrated).

When browser 1304 submits the form data contained in the HTML attachment to Web server 1312, it enables Web server 1312 to request a key from key server 1318. In one embodiment, the form data submitted to Web server 1312 include a URL that uniquely identifies a particular encryption key on a particular key server. The URL identifies one or more servers that store the key, the protocol to use to access the key, and the unique ID of the key. Web server 1312 uses this URL to securely retrieve the message encryption key from the appropriate key server 1318. Web server 1312 uses this encryption key to decrypt the encrypted message data. Web server 1312 then returns cleartext to HTML mail client 1306 or to browser 1304 for display to a user using a secure protocol such as HTTPS.

In another embodiment, the client transfers the encrypted message data and the encryption key identifier by means of embedded HTML code 1106 that is part of the main body of message 1102. In this mode, the HTML mail client 1306 renders the embedded HTML code 1106 and in doing so effects the transfer of encrypted message data and the encryption key identifier to Web server 1312. The embedded HTML code 1106 is designed to allow inline display in as many HTML-compatible mail user agents as possible. It is designed to maintain the security of the message. Specifically, it is designed to prevent the user's machine and proxies from accidentally maintaining copies of the cleartext after it has expired, and it is designed to prevent an attacker capable of observing communication channel 1322 between HTML mail client 1306 and Web server 1312 from obtaining the cleartext. Further, the embedded HTML code 1106 is designed to ensure that mail user agents and mail transport systems which use the HTML body to produce a plain text alternative (by stripping out HTML tags), will produce a plain text alternative which instructs the recipient to open the HTML attachment. Finally it is designed to ensure that users of mail user agents that display the HTML source verbatim (e.g. older versions of Lotus Notes and AOL) see instructions to open the HTML attachment.

In order to achieve the inline display of the cleartext message in HTML mail client 1306, the embedded HTML code 1106 must automatically cause the sending of encrypted message data, the encryption key identifiers associated with the message, and meta data such as header information associated with the message to Web server 1312 for processing. Further it must retrieve the cleartext of the decrypted message from Web server 1312 and display that cleartext and associated information (e.g. the time remaining until expiration). The cleartext and associated information is retrieved and displayed via either an <iframe>, an <ilayer>, <applet>, or an <img> element depending on what the HTML mail client 1306 supports. The <iframe> and <ilayer> elements display HTML from an external source inside of a Web page, in much the same way <img> elements display images from an external source inside of a Web page.

The message data, consisting of the encrypted message, the encryption key identifier, and message meta data, are sent to Web server 1312 in the URLs of the aforementioned <iframe>/<ilayer>/<applet>/<img> elements and in the URLs of additional <img> elements. The <img> elements' only purpose is to assist in sending message data to Web server 1312. Each of the plurality of URLs contained in these <iframe>/<ilayer>/<applet>/<img> elements contains a portion of the message data. Since URLs are limited to 4096 characters according to current HTML standards, multiple elements may be necessary to transport a lengthy message.

When message data is divided into several fragments contained in the URLs associated with multiple <iframe>/<ilayer>/<applet>/<img> elements, Web server 1312 needs to know which fragments belong to which messages, what order the fragments should be assembled in to recreate the full message data, and how many fragments each message has. In one embodiment, the query string portion of the URL contains control information in addition to the URL-encoded message data fragment. The control information and the message data fragment are query parameters named id, i, n, and v. Id is a unique ID for the message to which the fragment belongs; n is the number of fragments in the URL-encoded message data; i is the fragment number between 0 and n−1; and v is the URL-encoded message data fragment. By means of this control information, the Web server 1312 knows when all message fragments have been collected and in what order they should be processed.

When HTML mail client 1306 receives a message containing such embedded HTML code 1106 and the user (not illustrated) opens the message, HTML mail client 1306 attempts to render the HTML code. The rendering engine associated with HTML mail client 1306 automatically loads the elements containing the URL-encoded message data, thereby transferring the message data to Web server 1312, and attempts to display the content of the elements. This occurs because loading element contents is standard, defined behavior of a Web browser in response to encountering an <iframe>, <ilayer>, <applet>, or <img> element. As Web server 1312 receives requests for the embedded URLs, each of which contains a portion of the message, servlet 1314 maintains state information associated with the current client and transaction. In response to the ancillary <img> requests used to transport multiple message data fragments, Web server 1312 immediately returns a 1×1 transparent image to close the state of the image request. Web server 1312 does not issue a final response until it receives all associated URL-encoded message fragments for a particular message.

In response to receiving all associated URL-encoded message fragments from the client, Web server 1312 constructs the complete message from the previously received message fragments. Using servlet 1314, Web server 1312 decrypts the complete message that it has received. In response to the primary <iframe>, <ilayer>, <applet>, or <img> request, Web server 1312 provides to HTML mail client 1306 the cleartext of the message in a secure HTTPS response. The cleartext may be provided in the form of an image or a text stream depending on what HTML mail client 1306 supports.

C. Data Uploading

According to another embodiment of the invention, data is exchanged between two or more locations over a communications network using a set of related URLs. Data to be exchanged between locations is embedded in one or more URLs that are contained within the same document, related documents, or otherwise associated at a source location. The set of URLs is then exchanged between the source location and one or more destination locations. At the destination locations, the data and control information is extracted or otherwise recovered from the set of URLs, and optionally joined or otherwise processed to produce one or more sets of data.

This approach allows data to be exchanged between locations in arrangements where the particular protocol employed does not permit such an exchange. For example, the approach is applicable in the context of an HTTP system that uses HTML documents. Such systems conventionally support only a request-response mode of operation between a client and server, and do not natively support uploading of data from the client to the server. However, using the foregoing approach, automatic uploading is achieved in a system that does not support it. The payload that is uploaded may comprise any digital information, including email messages, music, streaming video, etc. The approach is applicable to unencrypted content or content encrypted using symmetric or asymmetric keys.

One embodiment of such a data uploading system uploads user registration information to a server so that the server can place an authentication token on the client machine. To register, a user simply reads a registration email sent by a registration server in an HTML mail client. Embedded HTML code in the message automatically uploads user information to the server by means of URLs embedded in <img> elements, and the server can respond by setting a registration cookie on the client computer. Thereafter, the client can uniquely identify itself to the server as the one who received that particular cookie. This embodiment provides a low interference authentication system that can be used by a key repository to limit access to message keys based on the identity of the user requesting a key.

15. Implementation Mechanisms

A. Overview

The approach described in this document for controlling and tracking access to disseminated information may be implemented in computer software, in hardware circuitry, or as a combination of computer software and hardware circuitry. Accordingly the invention is not limited to a particular implementation. For example, key repository 106 may be implemented as a "key server" communicatively coupled to a network. The approach may be implemented as a stand-alone mechanism or integrated into an existing system, such as a network or client application. Furthermore, key repository 106, log 300 and policy manager 400 may be implemented as separate mechanisms or implemented together in any combination and the invention is not limited to a particular implementation or combination.

B. Implementation Hardware

Figure 14:
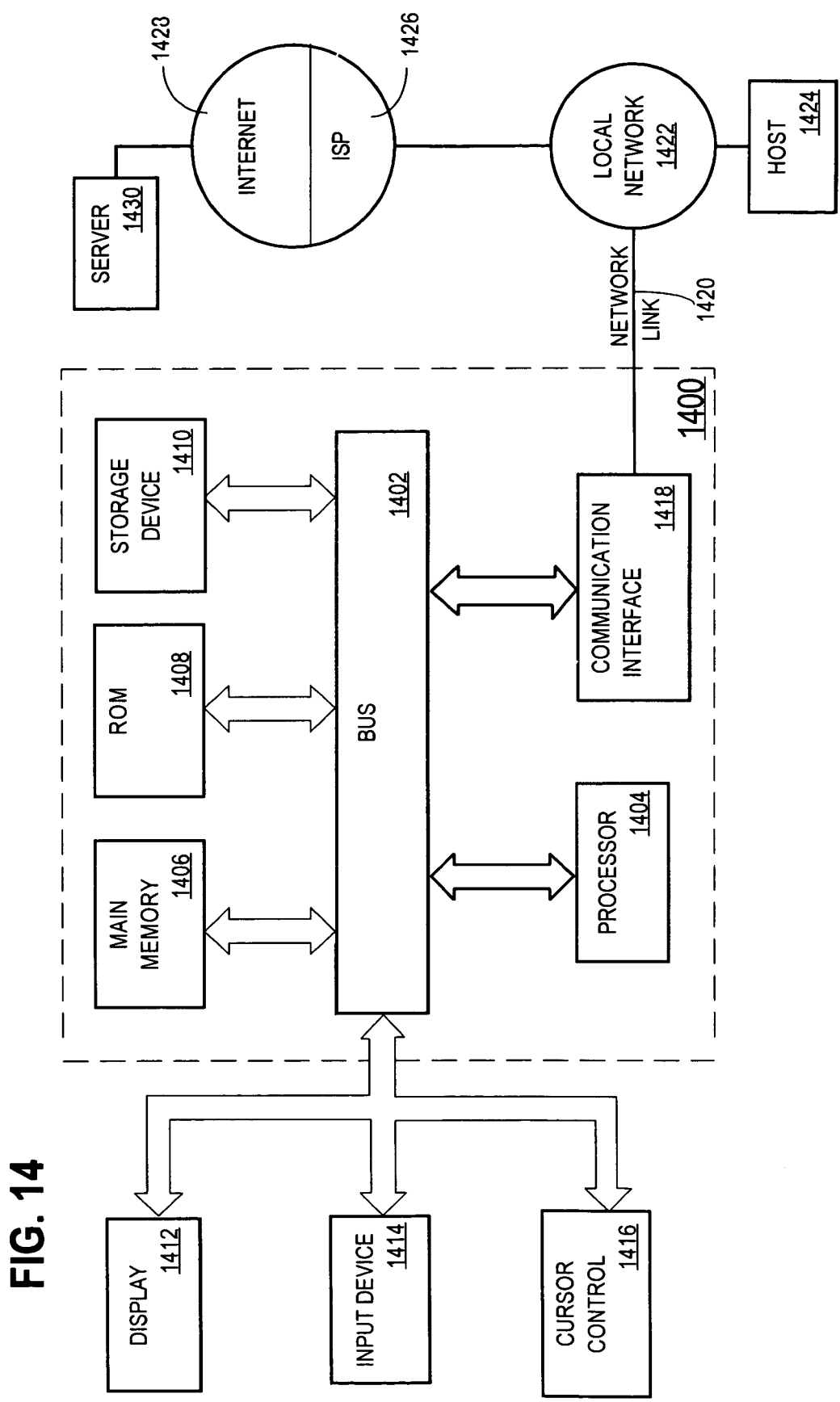
FIG. 14 is a block diagram of a computer system on which embodiments may be implemented.

FIG. 14 is a block diagram that illustrates a computer system 1400 upon which a computer program embodiment of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for controlling and tracking access to disseminated information. According to one embodiment of the invention, controlling and tracking access to disseminated information is provided by computer system 1400 in response to processor 1404 executing one or more sequences of one or more instructions contained in main memory 1406. Such instructions may be read into main memory 1406 from another computer-readable medium, such as storage device 1410. Execution of the sequences of instructions contained in main memory 1406 causes processor 1404 to perform the process steps described in this document. One or more processors in a multi-processing arrangement may also be employed to execute the sequences of instructions contained in main memory 1406. In alternative embodiments, hard-wired circuitry may be used in place of or in combination with software instructions to implement the invention. Thus, embodiments of the invention are not limited to any specific combination of hardware circuitry and software.

The term "computer-readable medium" as used in this document refers to any medium that participates in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described in this document, or any other medium from which a computer can read.

Various forms of computer readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infrared transmitter to convert the data to an infrared signal. An infrared detector coupled to bus 1402 can receive the data carried in the infrared signal and place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418. In accordance with the invention, one such downloaded application provides for controlling and tracking access to disseminated information as described in this document.

The received code may be executed by processor 1404 as it is received, and/or stored in storage device 1410, or other non-volatile storage for later execution. In this manner, computer system 1400 may obtain application code in the form of a carrier wave.

The approach described in this document for controlling and tracking access to dissemination information provides several advantages over prior approaches. In particular, the approach makes all copies of data inaccessible, regardless of where those copies reside and the exact location of those copies does not have to be known. The approach applies to copies of data stored in any type of medium including any type of volatile or non-volatile storage. For example, the approach applies to copies of data stored in volatile memory on a computer as well as copies of data stored in a non-volatile warehousing system. The approach is compatible with existing communications systems. In addition, the approach provides for tracking all entities that have requested keys to access data.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for controlling access to a message that is communicated from a first node to a second node in a network, the method comprising the computer-implemented steps of:
   generating, at the first node, an encoded message by encoding the message with a key;
   generating, at the first node, a set of one or more instructions that contain address data that indicates a location from which the key may be retrieved and executable code that implements a decryption algorithm for decoding the encoded message using the key; and
   providing the encoded message and the set of one or more instructions to the second node;
   wherein, processing the set of one or more instructions at the second node causes the message to be recovered from the encoded message by:
   retrieving the key from the location specified by the address data and decoding the encoded message using the key.

2. The method as recited in claim 1, further comprising deleting the retrieved key.

3. The method as recited in claim 1, wherein the set of one or more instructions comprises a set of Javascript instructions.

4. The method as recited in claim 1, wherein the set of one or more instructions comprises a set of Java applet instructions.

5. A computer-readable medium for controlling access to a message that is communicated from a first node to a second node in a network, the computer-readable medium carrying one or more sequences of one or more instructions which, when executed by one or more processors, cause the one or more processors to perform the steps of:
   generating, at the first node, an encoded message by encoding the message with a key;
   generating, at the first node, a set of one or more instructions that contain address data that indicates a location from which the key may be retrieved and executable code that implements a decryption algorithm for decoding the encoded message using the key; and
   providing the encoded message and the set of one or more instructions to the second node;
   wherein, processing the set of one or more instructions at the second node causes the message to be recovered from the encoded message by:
   retrieving the key from the location specified by the address data and
   decoding the encoded message using the key to recover the original message.

6. The computer-readable medium as recited in claim 5, further carrying one or more additional sequences of one or instructions which, when executed by the one or more processors, causes the one or more processors to perform the additional step of deleting the retrieved key.

7. The computer-readable medium as recited in claim 5, wherein the set of one or more instructions comprises a set of Javascript instructions.

8. The computer-readable medium as recited in claim 5, wherein the set of one or more instructions comprises a set of Java applet instructions.

9. A computer system comprising:
   one or more processors; and
   a memory communicatively coupled to the one or more processors and carrying one or more sequences of one or more instructions which, when executed by the one or more processors, cause the one or more processors to perform the steps of:
   generating, at the first node, an encoded message by encoding the message with a key;
   generating, at the first node, a set of one or more instructions that contain address data that indicates a location from which the key may be retrieved and executable code that implements a decryption algorithm for decoding the encoded message using the key; and
   providing the encoded message and the set of one or more instructions to the second node;
   wherein, processing the set of one or more instructions at the second node causes the message to be recovered from the encoded message by:
   retrieving the key from the location specified by the address data and
   decoding the encoded message using the key to recover the original message.

10. The computer system as recited in claim 9, wherein the memory further carries one or more additional sequences of one or instructions which, when executed by the one or more processors, causes the one or more processors to perform the additional step of deleting the retrieved key.

11. The computer system as recited in claim 9, wherein the set of one or more instructions comprises a set of Javascript instructions.

12. The computer system as recited in claim 9, wherein the set of one or more instructions comprises a set of Java applet instructions.

13. A method for controlling access to a message that is communicated from a first node to a second node in a network, the method comprising the computer-implemented steps of:
  generating, at the first node, an encoded message by encoding the message with a key;
  generating, at the first node, a set of one or more instructions that contain instructions for transferring to a third node the encoded message and instructions for retrieving the key;
  providing the encoded message and the set of one or more instructions to the second node;
  wherein, processing the set of one or more instructions at the second node causes the encoded message and the instructions for retrieving the key to be transferred to the third node; and
  wherein, the receiving, at the third node, of the encoded message and the instructions for retrieving the key causes:
    the message to be recovered from the encoded message by retrieving the key, and
      decoding the encoded message using the key, and
    the recovered message to be provided from the third node to the second node.

14. The method as recited in claim 13, wherein the receiving, at the third node, of the encoded message and the instructions for retrieving the key, further causes the key to be deleted from the third node after the encoded message is decoded.

15. The method as recited in claim 13, wherein the encoded message and the set of one or more instructions that contain the instructions for transferring to a third node the encoded message and instructions for retrieving the key are contained in an HTML document.

16. The method as recited in claim 15, wherein the HTML document comprises an HTML form with fields containing the encoded message and key address data, a submit button to submit the form to the third node, and JavaScript to automatically submit the form to the third node.

17. The method as recited in claim 15, wherein the HTML document comprises a set of associated URLs embedded in multiple <img>, <ilayer>, <applet>, or <iframe> elements, wherein each URL contains fragments of the encoded message and key address data as URL query parameters, and wherein each URL specifies the location of the third node.

18. The method as recited in claim 17, wherein the URL query parameters also contain control information, which specifies the order and number of message fragments, and enables the third node to reconstruct the complete message.

19. A computer-readable medium for controlling access to a message that is communicated from a first node to a second node in a network, the computer-readable medium carrying one or more sequences of one or more instructions which, when executed by one or more processors, cause the one or more processors to perform the steps of:
  generating, at the first node, an encoded message by encoding the message with a key;
  generating, at the first node, a set of one or more instructions that contain instructions for transferring to a third node the encoded message and instructions for retrieving the key;
  providing the encoded message and the set of one or more instructions to the second node;
  wherein, processing the set of one or more instructions at the second node causes the encoded message and the instructions for retrieving the key to be transferred to the third node; and
  wherein, the receiving, at the third node, of the encoded message and the instructions for retrieving the key causes:
    the message to be recovered from the encoded message by retrieving the key, and
      decoding the encoded message using the key, and
    the recovered message to be provided from the third node to the second node.

20. The computer-readable medium as recited in claim 19, wherein the receiving, at the third node, of the encoded message and the instructions for retrieving the key, further causes the key to be deleted from the third node after the encoded message is decoded.

21. The computer-readable medium as recited in claim 19, wherein the encoded message and the set of one or more instructions that contain the instructions for transferring to a third node the encoded message and instructions for retrieving the key are contained in an HTML document.

22. The computer-readable medium as recited in claim 21, wherein the HTML document comprises an HTML form with fields containing the encoded message and key address data, a submit button to submit the form to the third node, and JavaScript to automatically submit the form to the third node.

23. The computer-readable medium as recited in claim 21, wherein the HTML document comprises a set of associated URLs embedded in multiple <img>, <ilayer>, <applet>, or <iframe> elements, wherein each URL contains fragments of the encoded message and key address data as URL query parameters, and wherein each URL specifies the location of the third node.

24. The computer-readable medium as recited in claim 23, wherein the URL query parameters also contain control information, which specifies the order and number of message fragments, and enables the third node to reconstruct the complete message.

25. A computer system for controlling access to a message that is communicated from a first node to a second node in a network, the computer system comprising:
  one or more processors; and
  a memory communicatively coupled to the one or more processors and carrying one or more sequences of one or more instructions which, when executed by the one or more processors, causes the one or more processors to perform the steps of:
    generating, at the first node, an encoded message by encoding the message with a key;
    generating, at the first node, a set of one or more instructions that contain instructions for transferring to a third node the encoded message and instructions for retrieving the key;
    providing the encoded message and the set of one or more instructions to the second node;
    wherein, processing the set of one or more instructions at the second node causes the encoded message and the instructions for retrieving the key to be transferred to the third node; and wherein, the receiving, at the third node, of the encoded message and the instructions for retrieving the key causes:

the message to be recovered from the encoded message by retrieving the key, and decoding the encoded message using the key, and the recovered message to be provided from the third node to the second node.

26. The computer system as recited in claim 25, wherein the receiving, at the third node, of the encoded message and the instructions for retrieving the key, further causes the key to be deleted from the third node after they encoded message is decoded.

27. The computer system as recited in claim 25, wherein the encoded message and the set of one or more instructions that contain the instructions for transferring to a third node the encoded message and instructions for retrieving the key are contained in an HTML document.

28. The computer system as recited in claim 27, wherein the HTML document comprises an HTML form with fields containing the encoded message and key address data, a submit button to submit the form to the third node, and JavaScript to automatically submit the form to the third node.

29. The computer system as recited in claim 27, wherein the HTML document comprises a set of associated URLs embedded in multiple <img>, <ilayer>, <applet>, or <iframe> elements, wherein each URL contains fragments of the encoded message and key address data as URL query parameters, and wherein each URL specifies the location of the third node.

30. The computer system as recited in claim 29, wherein the URL query parameters also contain control information, which specifies the order and number of message fragments, and enables the third node to reconstruct the complete message.

* * * * *

UNITED STATES PATENT AND TRADEMARK OFFICE
CERTIFICATE OF CORRECTION

| | |
|---|---|
| PATENT NO. | : 7,096,355 B1 |
| APPLICATION NO. | : 09/923847 |
| DATED | : August 22, 2006 |
| INVENTOR(S) | : Maclen Marvit et al. |

It is certified that error appears in the above-identified patent and that said Letters Patent is hereby corrected as shown below:

In the Claims:

At. Col. 31, line 3, after "of one or", insert --more--.

Signed and Sealed this

Twenty-third Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,096,355 B1 | Page 1 of 1 |
| APPLICATION NO. | : 09/923847 | |
| DATED | : August 22, 2006 | |
| INVENTOR(S) | : Marvit et al. | |

It is certified that error appears in the above-identified patent and that said Letters Patent is hereby corrected as shown below:

In the Figures:

Sheet 11 of 21
The Text in Block 636 (Figure 6B)
Delete "DECRYPT USING ORIGINAL KEY" and insert --DECRYPT USING NEW KEY--.

In the Specification:

Column 17
Line 59
Delete "lest" and insert --least--.

Column 30
Line 35 (Claim 6)
Delete "of one or" and insert --of one or more--.

Signed and Sealed this

First Day of April, 2008

JON W. DUDAS
*Director of the United States Patent and Trademark Office*